US011111355B2

(12) United States Patent
LaPray et al.

(10) Patent No.: US 11,111,355 B2
(45) Date of Patent: Sep. 7, 2021

(54) ADDITION OF BIODEGRADABILITY LENDING ADDITIVES TO PLASTIC MATERIALS

(71) Applicant: BiologiQ, Inc., Idaho Falls, ID (US)

(72) Inventors: Bradford LaPray, Idaho Falls, ID (US); Donald R. Allen, Idaho Falls, ID (US)

(73) Assignee: BIOLOGIQ, INC., Idaho Falls, ID (US)

( * ) Notice: Subject to any disclaimer, the term of this patent is extended or adjusted under 35 U.S.C. 154(b) by 27 days.

(21) Appl. No.: 16/391,909

(22) Filed: Apr. 23, 2019

(65) Prior Publication Data

US 2019/0256681 A1    Aug. 22, 2019

Related U.S. Application Data

(63) Continuation-in-part of application No. 15/691,588, filed on Aug. 30, 2017, which is a continuation-in-part of application No. 14/853,725, filed on Sep. 14, 2015, now abandoned, and a continuation-in-part of application No. 14/853,780, filed on Sep. 14, 2015, now abandoned, and a continuation-in-part of application No. 15/481,806, filed on Apr. 7, 2017, and a continuation-in-part of application No. 15/481,823, filed on Apr. 7, 2017.

(60) Provisional application No. 62/661,387, filed on Apr. 23, 2018, provisional application No. 62/442,432, filed on Jan. 4, 2017, provisional application No. 62/440,399, filed on Dec. 29, 2016, provisional application No. 62/187,231, filed on Jun. 30, 2015.

(51) Int. Cl.
   *C08J 11/10* (2006.01)
   *C08J 11/16* (2006.01)
   *C08J 11/22* (2006.01)
   *C08J 11/28* (2006.01)
   *C08L 101/16* (2006.01)

(52) U.S. Cl.
   CPC .............. *C08J 11/105* (2013.01); *C08J 11/16* (2013.01); *C08J 11/22* (2013.01); *C08J 11/28* (2013.01); *C08L 101/16* (2013.01); *C08J 2323/00* (2013.01); *C08J 2327/00* (2013.01); *C08J 2405/00* (2013.01)

(58) Field of Classification Search
   CPC .................................. C08J 11/16; C08J 11/18
   See application file for complete search history.

(56) References Cited

U.S. PATENT DOCUMENTS

| | | |
|---|---|---|
| 3,270,874 A | 9/1966 | Hilton |
| 3,865,603 A | 2/1975 | Szymanski |
| 4,016,117 A | 4/1977 | Griffin |
| 5,026,745 A | 6/1991 | Weil |
| 5,095,054 A | 3/1992 | Lay et al. |
| 5,314,934 A | 5/1994 | Tomka |
| 5,449,708 A | 9/1995 | Schiltz |
| 5,462,983 A | 10/1995 | Bloembergen |
| 5,510,401 A | 4/1996 | Dehennau et al. |
| 5,714,445 A | 2/1998 | Trinh |
| 6,211,325 B1 | 4/2001 | Sun |
| 6,472,497 B2 | 10/2002 | Loercks et al. |
| 6,605,657 B1 | 8/2003 | Favis et al. |
| 6,783,854 B2 | 8/2004 | Bond |
| 6,818,295 B2 | 11/2004 | Bond et al. |
| 6,841,597 B2 | 1/2005 | Bastioli et al. |
| 6,844,380 B2 | 1/2005 | Favis et al. |
| 6,946,506 B2 | 9/2005 | Bond et al. |
| 7,608,649 B2 | 10/2009 | Sun |
| 7,666,261 B2 | 2/2010 | Bailey et al. |
| 7,740,952 B2 | 6/2010 | Hausmann |
| 7,998,888 B2 | 8/2011 | Shi |
| 8,188,185 B2 | 5/2012 | Wang |
| 8,232,348 B2 | 7/2012 | Changping |
| 8,283,006 B2 | 10/2012 | Wang |
| 8,329,501 B1 | 12/2012 | Robinson et al. |
| 8,329,601 B2 | 12/2012 | Shi |
| 8,466,337 B2 | 6/2013 | Wang |
| 8,802,754 B2 | 8/2014 | Nie |
| 8,807,254 B2 | 8/2014 | Manus |
| 8,889,945 B2 | 11/2014 | Wang |
| 8,927,611 B2 | 1/2015 | Voolapalli et al. |
| 8,927,617 B2 | 1/2015 | Funk |
| 8,969,224 B2 | 3/2015 | Masuda et al. |
| 9,056,968 B2 | 6/2015 | Matsuo et al. |
| 9,273,207 B2 | 3/2016 | Bastioli |
| 9,327,438 B2 | 5/2016 | Wang |
| 9,464,188 B2 | 10/2016 | Wang |
| 9,884,471 B2 | 2/2018 | Neuman et al. |
| 10,131,783 B2 | 11/2018 | Schmidt et al. |
| 10,214,634 B2 | 2/2019 | LaPray |
| 10,239,292 B2 | 3/2019 | Nissenbaum et al. |
| 10,752,759 B2 | 8/2020 | Lapray et al. |

(Continued)

FOREIGN PATENT DOCUMENTS

BY          21006 C1 *    4/2017
CA          1031088       5/1978
                (Continued)

OTHER PUBLICATIONS

English abstractor BY 21006 C1 (Year: 2017).*

(Continued)

Primary Examiner — Wenwen Cai
(74) Attorney, Agent, or Firm — Workman Nydegger

(57) ABSTRACT

Described herein are methods for rendering biodegradable a plastic material that is not itself biodegradable, by blending the plastic material with a carbohydrate-based polymeric material that is formed from a) one or more starches and a plasticizer (e.g., glycerin), b) an additive known in the art as an OXO material and/or an additive that interacts with microbes that contribute to biodegradation of the non-biodegradable material. The carbohydrate-based polymeric material is less crystalline than the non-biodegradable materials, e.g., being substantially amorphous, and having a crystallinity of no more than 20%. When tested under conditions causing biodegradation, the blend biodegrades to an extent greater than the content of the carbohydrate-based polymer.

20 Claims, 3 Drawing Sheets

(56) References Cited

U.S. PATENT DOCUMENTS

| | | |
|---|---|---|
| 2002/0006989 A1 | 1/2002 | Bastioli |
| 2002/0168517 A1 | 11/2002 | Husemann et al. |
| 2002/0168518 A1 | 11/2002 | Bond et al. |
| 2002/0188041 A1 | 12/2002 | Bond et al. |
| 2003/0077444 A1 | 4/2003 | Bond et al. |
| 2003/0166779 A1 | 9/2003 | Khemani |
| 2007/0129468 A1 | 6/2007 | Bastioli et al. |
| 2008/0103232 A1 | 5/2008 | Lake |
| 2008/0287592 A1 | 11/2008 | Favis |
| 2009/0048368 A1 | 2/2009 | Bash |
| 2010/0159777 A1 | 6/2010 | Wang |
| 2010/0311874 A1 | 12/2010 | Mentink |
| 2011/0287929 A1 | 11/2011 | Smith |
| 2012/0059097 A1 | 3/2012 | Liao |
| 2012/0139154 A1 | 6/2012 | Huneault |
| 2012/0283364 A1 | 11/2012 | Sarazin et al. |
| 2012/0316257 A1 | 12/2012 | Bastioli |
| 2013/0001289 A1 | 1/2013 | Tedford |
| 2013/0157031 A1 | 6/2013 | Wang |
| 2013/0157032 A1 | 6/2013 | Wang |
| 2014/0011921 A1 | 1/2014 | Bash |
| 2014/0079935 A1 | 3/2014 | Broyles |
| 2014/0272370 A1 | 9/2014 | Broyles |
| 2016/0107426 A1 | 4/2016 | Leufgens |
| 2017/0002184 A1 | 1/2017 | Lapray et al. |
| 2017/0002185 A1 | 1/2017 | Lapray et al. |
| 2017/0210889 A1 | 7/2017 | LaPray |
| 2017/0218184 A1 | 8/2017 | LaPray |
| 2017/0283597 A1 | 10/2017 | LaPray |
| 2017/0362418 A1 | 12/2017 | LaPray |
| 2018/0100060 A1 | 4/2018 | LaPray |
| 2019/0194426 A1 | 6/2019 | Lapray et al. |
| 2019/0276664 A1 | 9/2019 | LaPray |
| 2019/0315942 A1 | 10/2019 | LaPray |
| 2019/0315947 A1 | 10/2019 | LaPray |
| 2020/0339781 A1 | 10/2020 | Lapray et al. |
| 2020/0339784 A1 | 10/2020 | Lapray et al. |
| 2020/0339803 A1 | 10/2020 | Allen et al. |
| 2020/0377705 A1 | 12/2020 | LaPray et al. |

FOREIGN PATENT DOCUMENTS

| | | |
|---|---|---|
| CN | 1603361 | 4/2005 |
| CN | 101589097 | 11/2009 |
| CN | 102153786 A | 8/2011 |
| CN | 102329436 A | 1/2012 |
| CN | 101805499 B | 5/2012 |
| CN | 102850626 | 2/2013 |
| CN | 103289165 | 9/2013 |
| CN | 103819794 A | 5/2014 |
| CN | 103987504 | 8/2014 |
| CN | 103998195 | 8/2014 |
| CN | 105966014 | 9/2016 |
| CN | 103627153 B | 2/2018 |
| CN | 107793619 A | 3/2018 |
| CN | 105670239 B | 6/2018 |
| CN | 108276744 | 7/2018 |
| EP | 326517 | 7/1994 |
| EP | 1930487 A1 | 6/2008 |
| EP | 2762307 | 8/2014 |
| GB | 2272699 | 5/1994 |
| JP | S49055740 | 5/1974 |
| JP | S50086543 | 7/1975 |
| JP | H07126449 | 5/1995 |
| JP | H07258488 | 10/1995 |
| JP | H09041224 | 2/1997 |
| JP | 10-259083 A | 9/1998 |
| JP | H11322962 | 11/1999 |
| JP | 2003518541 | 6/2003 |
| JP | 3539955 | 7/2004 |
| JP | 2005089718 | 4/2005 |
| JP | 2005264111 | 9/2005 |
| JP | 2008-013602 A | 1/2008 |
| JP | 2010150305 | 7/2010 |
| JP | 2010260923 | 11/2010 |
| JP | 2011042032 | 3/2011 |
| JP | 2011511121 | 4/2011 |
| JP | 2011213836 | 10/2011 |
| JP | 2012148507 | 8/2012 |
| JP | 5544303 | 7/2014 |
| JP | 2018502744 | 2/2018 |
| JP | 2018525467 | 9/2018 |
| TW | 201538529 | 10/2015 |
| WO | 0148078 | 7/2001 |
| WO | 2003014164 | 11/2004 |
| WO | 2006116861 | 11/2006 |
| WO | 2007027163 | 3/2007 |
| WO | 2009073197 | 6/2009 |
| WO | 2009103052 | 8/2009 |
| WO | 2011020170 | 2/2011 |
| WO | 2012088585 | 7/2012 |
| WO | 2013116945 | 8/2013 |
| WO | 2014089321 | 6/2014 |
| WO | 2014/190935 A1 | 12/2014 |
| WO | 2014190395 | 12/2014 |
| WO | 2015028943 | 3/2015 |
| WO | 2016109196 | 7/2016 |
| WO | 2016/134994 A1 | 9/2016 |
| WO | 2018/125897 A1 | 7/2018 |
| WO | 2018187784 | 10/2018 |

OTHER PUBLICATIONS

U.S. Appl. No. 16/999,542, filed Aug. 21, 2020, LaPray.
U.S. Appl. No. 16/925,705, filed Jul. 10, 2020, LaPray.
U.S. Appl. No. 16/925,952, filed Jul. 10, 2020, LaPray.
U.S. Appl. No. 16/925,747, filed Jul. 10, 2020, LaPray.
U.S. Appl. No. 15/481,806, filed Jul. 29, 2020, Office Action.
U.S. Appl. No. 15/481,823, filed Jul. 20, 2020, Final Office Action.
U.S. Appl. No. 16/456,295, filed Jul. 22, 2020, Office Action.
U.S. Appl. No. 16/287,884, filed Jul. 30, 2020, Office Action.
U.S. Appl. No. 15/836,555, filed Jul. 14, 2020, Office Action.
Ruchuan et al., "Study on Starch-Polyethylene Film", Journal of Tianjin University, No. 2, 1990, pp. 23-29.
U.S. Appl. No. 16/287,884, filed Feb. 27, 2019, LaPray.
"APR Position Statement—Degradable Additives Use in Bottles, Forms and Films" The Association of Postconsumer Plastic Recyclers, http://plasticsrecycling.org/about/position-statements, Apr. 27, 2015, 1 page.
Arevalo-Nino et al., "Starch-based extruded plastic films and evaluation of their biodegradable properties" Biodegradation 7: 231-237, 1996.
Bastioli et al. "Starch in Polymers Technology" ACS Symposium Series, Jan. 1, 2012, American Chemical Society/Oxford University Press, XP055490447, vol. 1114, pp. 87-112.
Braskem "Life Cycle Assessment of Green Plastic" Available as early as Mar. 28, 2017, accessed at http://www.braskem.com_site.aspx_plastic-green, 18 pages.
Cardia Bioplastics FAQ [online] [site accessed Oct. 23, 2018] URL: http://www.cardiabioplastics.com/our-business/faq.
Chen et al. "Environmental Degradation of Starch/Poly (Lactic Acid) Composite in Seawater" Apr. 6, 2010.
"Compostable Plastics 101: An Overview of Compostable Plastics Sponsored by the California Organics Recycling Council" based on information and belief, available at least as early as 2012, 23 pages.
"Discover Polysaccharides" Available at http://polysac3db.cermav.cnrs.fr/discover_starch.html; Accessed Feb. 16, 2017, 10 pages.
De Guzman "Coca-Cola produces 100% Bio-Based PET Bottle" Green Chemicals Blog, Jun. 9, 2015, 3 pages, accessed on Mar. 28, 2017 at https://greenchemicalsblog.com/2015/06/09/coca-cola-produces-100-bio-based-pet-bottle/ 3 pages.
"Environmentally Degradable Plastics" Leonardo Da Vinci Program; Jan. 2000-Dec. 2006.
Esmaeili et al. "Biodegradation of Low-Density Polyethylene (LDPE) by Mixed Culture of Lysinibacillus xylanilyticus and Aspergillus niger in Soil." *PLoS ONE* 8(9): e71720, Sep. 23, 2013. https://doi.org/10.1371/journal.pone.0071720. Accessed Apr. 16, 2018.

(56) References Cited

OTHER PUBLICATIONS

Eyheraguibel, et al. "Characterization of oxidized oligomers from polyethylene films by mass spectrometry and NMR spectroscopy before and after biodegradation by a *Rhodococcus rhodochrous* strain" Chemosphere 184, 2017, pp. 366-374.
Fujisawa, et al. "Degradation of Polyethylene and Nylon 66 by the Laccase-Mediator System" Journal of Polymers and the Environment, vol. 9, Issue 3, 2001, pp. 103-108.
Gupta et al. "Visible Range Photocatalysts for Solid Phase Photocatalytic Degradation of Polyethylene and Polyvinyl Chloride." *Journal of the Chilean Chemical Society*, [S.I.], v. 62, n. 1, Jun. 2017. ISSN 0717-9707. <https://jcchems.com/index.php/JCCHEMS/article/view/156>. Accessed: Apr. 20, 2018.
Ibbrucker, Constance "Can Additives make plastics biodegradable?" Bioplastics Magazine Jan. 2017, 1 page.
Ibbrucker, Constance "Oxo-degradable plastics increasingly under fire in Europe" European Bioplastics, http://www.european-bioplastics.org/oxo-degradable-plastics-increasingly-under-fire-in-europe/ Feb. 28, 2017, 5 pages.
Kalambur, et al., "An Overview of Starch-Based Plastic Blends from Reactive Extrusion" Journal of Plastic Film and Sheeting, 2006, vol. 22, pp. 39-58.
Li, Gang, et al., "Biodegradation of Thermoplastic Starch and its Blends with Poly(lactic acid) and Polyethylene: Influence of Morphology" published in *Macromolecular Journals of Chemistry and Physics*, 2011 pp. 1147-1154.
Luo et al. "Accelerating the degradation of polyethylene composite mulches." Plastics Research Online, May 19, 2017. Society of Plastics Engineers (SPE), DOI: 10.2417/spepro.006909. Accessed Apr. 20, 2018.
Ohtake, et al. "The Biodegradability of Polyethylene" Material Life, vol. 6, Issue 3, 1994, pp. 125-133.
Ojeda, Telmo, et al., "Polymer Degradation and Stability" Available as early as Dec. 16, 2010 at www.elsevier.com/locat/polydegstab, 5 pages.
"Oxo-Biodegradable Plastics and Other Plastics with Additives for Degradation" European Bioplastics BackGround Oct. 2015, 5 pages.
Oluz et al. "Additives for ultraviolet-induced oxidative degradation of low-density polyethylene." *J. Appl. Polym. Sci.*, 133, 43354, Jan. 18, 2016. *Wiley Online Library*, DOI: 10.1002/app.43354. Accessed Apr. 21, 2018.
Shang et al. "Photocatalytic Degradation of Polystyrene Plastic under Fluorescent Light." *Environmental Science & Technology*, Sep. 5, 2003, 37 (19), pp. 4494-4499. *American Chemical Society*, DOI: 10.1021/es0209464. Accessed Apr. 20, 2018.
Shogren et al. "Biodegradation of starch/polylactic acid/poly(hydroxyester-ether) composite bars in soil" Polymer Degradation and Stability 79 (2003) 405-411.
"The SPC Position Against Biodegradability Additives for Petroleum-Based Plastics" Sustainable Packaging Coalition, http://www.sustainablepackaging.org/content/?type=5&id=position-against-biodegradability-additives-for-petroleum-based-plastics Retrieved on Sep. 19, 2017, 5 pages.
Sumathi et al. "Production of Laccase by *Cochliobolus* sp. Isolated from Plastic Dumped Soils and Their Ability to Degrade Low Molecular Weight PVC." *Biochemistry Research International* 2016 (2016): 9519527. *PMC*. Web. Apr. 16, 2018.
Tang, et al., "Recent Advances in Starch, Polyvinyl Alcohol Based Polymer Blends, Nanocomposites and their Biodegradability" Carbohydrate Polymers, 2011, vol. 85, pp. 7-16.
Tena-Salcido et al. "Effect of Morphology on the Biodegradation of Thermoplastic Starch in LDPE/TPS Blends" Polymer Bulletin, vol. 60, No. 5, Jan. 30, 2008, pp. 677-688.
Thakore, I.M., et al., "Studies on Biodegradability, morphology and thermo-mechanical properties of LDPE/modified starch blends" published in *The European Polymer Journal*, vol. 37 2001, pp. 151-160.
Thryft "Biodegradable Plastics Standard to Bust Landfill Waste." ENSO Plastics, Nov. 15, 2011. http://ensoplastics.com/theblog/?p=535. Accessed Apr. 23, 2018.
Tokiwa, et al., "Biodegradability of Plastics" in the *International Journal of Molecular Sciences*, Aug. 26, 2009, vol. 10, pp. 3722-3742.
"Transition Metal Salts." Oxo-biodegradable Plastics Association, http://www.biodeg.org/index.html. Accessed Apr. 20, 2018.
Turley "Coca-Cola Collaborates on Bio-PET Project" ChemistryWorld, Jun. 11, 2012, accessed Apr. 6, 2017 at https://www.chemistryworld.com/news/coca-cola-collaborates-on-bio-pet-project/5091.article, 2 pages.
Van Soest et al. "Crystallinity in Starch Plastics: Consequences for Material Properties" Trends in Biotechnology, vol. 15, No. 6, Jun. 1, 1997, pp. 208-213.
Vargha, et al., "Behavior of Polyethylene Films in Soil" published in *Periodica Polytechnica Chemical Engineering*, Nov. 5, 2015 pp. 60-68.
Wootthikanokkhan, et al., "Effect of Blending Conditions on Mechanical, Thermal, and Rheological Properties of Plasticized Poly(lactic acid)/Maleated Thermoplastic Starch Blends," Journal of Applied Polymer Science, 2012, vol. 124, pp. 1012-1019.
Yoshida, et al., "A Bacterium that Degrades and Assimilates Poly(ehylene terphthalate)" Science Magazine vol. 351 Issue 6278 Mar. 11, 2016 pp. 1196-1199.
Zhang, et al. "Retrogradation and Antiplasticization of Thermoplastic Starch" Mar. 2012.
PCT Search Report dated Sep. 14, 2016 for PCT/US2016/040092, 1 page.
PCT Search Report dated Sep. 15, 2016 for PCT/US2016/040104, 1 page.
International Search Report and Written Opinion for PCT PCT/US2017/068492 dated Mar. 16, 2018, 14 pages.
PCT International Search Report and Written Opinion for PCT/US2018/026610 dated Jul. 13, 2018.
"Background on Biodegradable Additives" BPI, Feb. 12, 2010.
"Case Study: Compostable vs Oxo Degradable" Natur Bag, Feb. 19, 2019.
"French Proposal for Law on Biodegradable Plastics" Oxo-Biodegradable Plastics Association, Revised Oct. 31, 2013.
Pearce "Biodegradable plastic bags carry more ecological harm than good" The Guardian, Jun. 18, 2009.
"Position Paper on Degradable Additives" SPI Bioplastics Division, issued Feb. 2016.
"Report from the Commission to the European Parliament and the Council on the Impact of the Use of Oxo-Degradable Plastic, Including Oxo-Degradable Plastic Carrier Bags, on the Environment" European Commission, Brussels, Jan. 16, 2018.
"The Flexible Packaging Association Position on Degradable Additives" FPA, Jun. 21, 2010.
"What Are Oxo-biodegradable Additives" MJS Packaging, May 8, 2014.
U.S. Appl. No. 14/853,780, filed Oct. 12, 2016, Office Action.
U.S. Appl. No. 14/853,725, filed Apr. 28, 2017, Office Action.
U.S. Appl. No. 14/853,780, filed May 24, 2017, Final Office Action.
U.S. Appl. No. 14/853,780, filed Nov. 6, 2017, Office Action.
U.S. Appl. No. 14/853,725, filed Nov. 8, 2017, Final Office Action.
U.S. Appl. No. 15/691,588, filed Apr. 30, 2018, Office Action.
U.S. Appl. No. 15/628,379, filed Apr. 30, 2018, Office Action.
U.S. Appl. No. 15/481,823, filed Apr. 30, 2018, Office Action.
U.S. Appl. No. 15/481,806, filed Apr. 30, 2018, Office Action.
U.S. Appl. No. 14/853,780, filed Aug. 10, 2018, Office Action.
U.S. Appl. No. 15/628,379, filed Oct. 3, 2018, Notice of Allowance.
U.S. Appl. No. 15/481,806, filed Oct. 12, 2018, Office Action.
U.S. Appl. No. 15/481,823, filed Oct. 12, 2018, Office Action.
U.S. Appl. No. 14/853,725, filed Oct. 12, 2018, Office Action.
U.S. Appl. No. 15/691,588, filed Jan. 2, 2019, Office Action.
U.S. Appl. No. 15/481,806, filed Feb. 28, 2019, Office Action.
U.S. Appl. No. 15/481,823, filed Feb. 28, 2019, Office Action.
U.S. Appl. No. 14/853,780, filed Feb. 28, 2019, Office Action.
U.S. Appl. No. 15/691,588, filed May 10, 2019, Office Action.
Marianne Shirai "Thermoplastic starch/polyester films: Effects of extrusion process and poly (lactic acid) addition," Elsevier, Materials Science and Engineering, 2013, pp. 4112-4117.

(56) References Cited

OTHER PUBLICATIONS

Emmanuel Schwach "Starch-based biodegradable blends: morphology and interface properties," Polymer International, 2004, pp. 2115-2124.

Jie Ren "Preparation, characterization and properties of binary and ternary blends with thermoplastic starch, poly (lactic acid) and poly(butylene adipate-co-terephthalate)," Elsevier, Carbohydrate Polymers, 2008, pp. 576-582.

S.K. Nayak "Biodegradable PBAT/Starach Nanocomposites" Polymer-Plastics Technology and Engineering, 2010, pp. 1406-1418.

*Fine Chemical Engineering Green Production Process*, 1$^{st}$ edition, edited by Qihuang Song, Guangdong Science & Technology Press, published on Mar. 31, 2006, p. 174.

U.S. Appl. No. 15/481,806, filed Nov. 6, 2019, Final Office Action.

U.S. Appl. No. 15/691,588, filed Dec. 9, 2019, Final Office Action.

U.S. Appl. No. 15/481,823, filed Dec. 9, 2019, Office Action.

Huagong et al., "Green Manufacturing Process of Fine Chemical Industry", 2006, Guangdong Science & Technology Press (National Outstanding Press).

Nayak, "Biodegradable PBAT/Starch Nanocomposites", Nov. 24, 2010, Polymer-Plastics Technology and Engineering, 49:14, pp. 1406-1418, accessed on Feb. 24, 2013.

Ren et al., "Preparation, characterization and properties of binary and ternary blends with thermoplastic starch, poly(lactic acid) and poly(butylene adipate-co-terephthalate)", 2009, Carbohydrate Polymers, vol. 77, pp. 576-582.

Santos, R. A. L. et al. "Starch/Poly 9 Butylene Adipate-Co Terephthlalate/ Montmorillonite Films Produced by Blow Extrusion".

Schwach et al., "Starch-based biodegradable blends: morphology and interface properties", 2004, Polymer International, vol. 53, pp. 2115-2124, DOI: 10.1002/pi.1636.

Shirai et al., "Thermoplastic starch/polyester films: Effects of extrusion process and poly (lactic acid) addition", 2013, Materials Science and Engineering C, vol. 33, pp. 4112-4117.

U.S. Appl. No. 15/481,823, filed Jul. 12, 2019, Final Office Action.

U.S. Appl. No. 15/836,555, filed Feb. 7, 2020, Final Office Action.

U.S. Appl. No. 16/456,303, filed Apr. 9, 2020, Office Action.

Ahmed et al. "Biodegradation of plastics: current scenario and future prospects for environmental safety." Environmental Science and Pollution Research 25.8 7287-7298. p. 7 col. 1 paragraph 2; Table 1; and Figure 1.

International Search Report issued in PCT Application PCT/US2019/28733.

U.S. Appl. No. 15/1836,555, filed Aug. 12, 2019, Office Action.

IDS Statement filed Aug. 21, 2020 in U.S. Appl. No. 16/999,542.

Machine translation of JP-2008013602-A (Year: 2008).

Notice of Allowance received for U.S. Appl. No. 15/481,806, dated Jan. 7, 2021, 11 pages.

Notice of Allowance received for U.S. Appl. No. 15/481,823, dated Dec. 9, 2020, 9 pages.

Notice of Allowance received for U.S. Appl. No. 15/481,823, dated Jan. 8, 2021, 2 pages.

Notice of Allowance received for U.S. Appl. No. 16/456,295, dated Dec. 15, 2020, 3 pages.

Notice of Allowance received for U.S. Appl. No. 16/456,295, dated Nov. 19, 2020, 11 pages.

Examiner Interview Summary received for U.S. Appl. No. 15/836,555, dated Mar. 29, 2021, 2 pages.

Non-Final Office Action received for U.S. Appl. No. 16/425,397, dated Feb. 5, 2021, 13 pages.

Notice of Allowance received for U.S. Appl. No. 15/691,588, dated Feb. 24, 2021, 11 pages.

"BPI Position on Degradable Additives" Feb. 2010, 6 pages.

"Environmentally Degradable Plastics," Leonardo Da Vinci Program, Contract Nol 1/98/2/05261 /PI/11.1.1.b/CONT, 202 pages. May 4, 1999.

"Biodegradation of starch-polyethylene films in soil and by microbial cultures", Nov. 1997, Dave, et al. World Journal of Microbiology and Technology, 13, 655-68., World Journal of Microbiology and Technology, 655-668, 13.

Applicant's Transmittal Letter labeled Information Disclosure Statement Under 37 CFR 1.97 dated Sep. 26, 2018.

Arvanitoyannis et al., Biodegradable films made from low density polyethylene (LDPE), rice starch and potato starch for food packaging applications: Part 1, Carbohydrate Polymers, vol. 36, (1998), pp. 89-104.

Biodegradable Plastics Standard to Bust Landfill Waste, ENSO Plastic Blog, printed Feb. 20, 2019, 3 pages.

Campo, E. Alfredo, Polymeric Materials and Properties, Science Direct, 2018.

Cardia Biohybrid, Film Blowing/ Blow Moulding Resin, Sep. 8, 2017.

Cardia Bioplastics FAQ [online] [site accessed Oct. 23, 2020 18] URL: http://www.cardiabioplastics.com/our-business/faq.

Cardia Compostable B-F, Blown Film Resin, Biodegradable during Composting in Professionally Managed Facilities, CBP Technical Data Sheet, 110317, 2 pages. 2019.

Chen et al., "Environmental Degradation of Starch/Poly(Lactic Acid) Composite in Seawater," Key and Open Laboratory of Marine and Estuarine Fisheries Ministry of Agriculture, East China Sea Fisheries Research Institute, Chinese Academy of Fishery Sciences, Polymers and Polymer Composites, vol. 19, No. 7, 2011, pp. 559-566.

Corn Starch/Fisher Scientific, 3 pages [online] [site accessed Sep. 18, 2020] url: https://www.fishersci.com/shop/products/corn-starch-2/S25580 (undated).

Droge et al, WO 2016/134994 Machine Translation, Sep. 1, 2016 (Year: 2016).

Final Office Action received for U.S. Appl. No. 15/836,555, dated Nov. 30, 2020, 27 pages.

Gadhave et al., Starch Based Bio-Plastics: The Future of Sustainable Packaging, Open Journal of Polymer Chemistry, 2018, vol. 8, pp. 21-33.

Gilfillan, "Developing Starch-Based Polymer Composites", Doctor of Philosophy, 2015, pp. 1-128.

Meereboer et al., "Review of recent advances in the biodegradability of polyhydroxyalkanoate (PHA) bioplastics and their composites," Green Chem., vol. 22, 2020, pp. 5519-5558.

Ming et al, CN107793619 Machine Translation, Mar. 13, 2018 (Year: 2018).

Nguyen et al., "Biodegradability of polymer film based on low density polyethylene and cassava starch," International Biodeterioration & Biodegradation, vol. 115, 2016, pp. 257-265.

Non-Final Office Action received for U.S. Appl. No. 15/691,588, dated Sep. 24, 2020, 10 pages.

Notice of Allowance received for U.S. Appl. No. 16/456,303, dated Jul. 1, 2020.

Notice of Allowance received for U.S. Appl. No. 16/456,303, dated Jul. 28, 2020.

Office action for U.S. Appl. No. 14/853,725, dated Apr. 30, 2018, LaPray et al., "Articles Formed with Biodegradable Materials and Strength Characteristics of Same", 19 pages.

Ojeda, et al., "Degradability of linear polyolefins under natural weathering, Polymer Degradation and Stability," 2011, pp. 703-707.

Sashiwa et al., "Microbial Degradation Behavior in Seawater of Polyester Blends Containing Poly(3-hydroxybutyrate-co-3-hydroxyhexanoate) (PHBHHx)," Mar. Drugs, vol. 16, 2018, 34, 11 pages.

Shahin, "In-situ Nano Fibrillation of Polyethylene Terephthalate (PET) in Polypropylene (PP) through Spunbond Process," Department of Mechanical and Industrial Engineering, 2019, 89 pages.

U.S. Appl. No. 15/481,823, filed Apr. 7, 2017, LaPray.

U.S. Application Filed on Apr. 7, 2017, by LaPray, U.S. Appl. No. 15/481,806.

U.S. Application Filed on Aug. 30, 2017, by LaPray., U.S. Appl. No. 15/691,588.

U.S. Application Filed on Jun. 20, 2017, by LaPray, U.S. Appl. No. 15/628,379.

Vargha et al., "Behavior of Polyethylene Films in Soil, Periodica Polytechnica Chemical Engineering," DOI: 10.3311/PPch. 8281, Creative Commons Attribution, 2016, pp. 60-68.

(56) References Cited

OTHER PUBLICATIONS

Yu et al., "Morphology and Mechanical Properties of Immiscible Polyethylene/Polyamide12 Blends Prepared by High Shear Processing," Chinese Journal of Polymer Science, 2017, 35(9):1132-1142.
Zhang et al., "Retrogradalion and Antiplasticization of Thermoplastic Starch," Richardson Centre for Functional Foods and Nutraceuticals, University of Manitoba, www.intechopen.com, 19 pages. 2012.
Zhong et al., "Biodegradable polymers and green-based antimicrobial packaging materials: A mini-review," Advanced Industrial and Engineering Polymer Research, vol. 3, 2020, pp. 27-35.

* cited by examiner

ADDITION OF BIODEGRADABILITY LENDING ADDITIVES TO PLASTIC MATERIALS

CROSS-REFERENCE TO RELATED APPLICATIONS

This application claims the benefit of U.S. Provisional Application No. 62/661,387 filed Apr. 23, 2018. This application is also a continuation in part of U.S. application Ser. No. 15/691,588 (21132.7) filed on Aug. 30, 2017 which is a continuation in part of U.S. application Ser. No. 14/853,725 (21132.8) filed on Sep. 14, 2015 which claims the benefit of U.S. Provisional Patent Application No. 62/187,231 filed on Jun. 30, 2015. U.S. application Ser. No. 15/691,588 (21132.7) is also a continuation in part of U.S. application Ser. No. 14/853,780 (21132.6) filed on Sep. 14, 2015, and a continuation in part of U.S. application Ser. No. 15/481,806 (21132.1) and Ser. No. 15/481,823 (21132.2), both filed on Apr. 7, 2017. U.S. application Ser. No. 15/691,588 (21132.7) also claims the benefit of U.S. Provisional Patent Application No. 62/440,399 (21132.10) filed on Dec. 29, 2016, and U.S. Provisional Patent Application No. 62/442,432 (21132.11) filed on Jan. 4, 2017. The entire contents of each of the foregoing is incorporated by reference herein. U.S. Provisional Patent Application No. 62/483,109 (21132.5), filed Apr. 7, 2017 is also incorporated by reference herein, in its entirety.

BACKGROUND

Traditional petrochemical-based plastics are formulated to be strong, lightweight, and durable. For this reason they are used in large quantities in countless consumer products. However, these plastics are generally not biodegradable to a significant extent, and as a result, hundreds of millions of tons of plastic sits in landfills or floats in the ocean. In trying to reduce the amount of plastic waste, some articles typically produced using petrochemical-based plastics are being produced using biodegradable materials.

Petrochemical-based plastics materials, such as large quantities of polyethylene and polypropylene, as well as numerous other plastics (polyethylene terephalate polyester, polystyrene, ABS, polyvinyl chloride, polycarbonate, nylon, and the like) are typically not readily biodegradable. Such is typically the case even for so called "green" plastics of such materials, which may be sourced from renewable or sustainable sources, rather than petro-chemical feedstocks.

There have recently been efforts to render such plastic materials increasingly degradable by addition of UV and/or OXO degradable additives (e.g., such as PDQ-M, PDQ-H, BDA, and OxoTerra™ Additive from Willow Ridge Plastics, OX1014 Additive from LifeLine, or organic additives (e.g., such as Enso Restore® by Enso, EcoPure® Additive by Bio-Tec Environmental, ECM Masterbatch Pellets additive by ECM Biofilms, or BioSphere®). Biodegradable Plastic Additive. The OXO degradable additives are known to break up the long carbon chains of materials which makes the materials more susceptible to biodegradation. The degradation of the plastic materials in this manner is by action of UV and/or oxygen. Subsequent action is generally instituted by microorganisms, bacteria or fungi. The use of such additives is often frowned upon by some plastic industry associations (e.g., SPC, APR, FPA, and/or BPI), and government bodies such as the European Union and some states, especially California. The degree of degradability (particularly any biodegradability) and the rate of degradation caused is often thought to be too slow, and the UV and/or OXO additives may simply initiate structural fragmentation or degradation that accelerates physical deterioration of such plastic materials into small pieces ("micro plastic") of the underlying base plastic material, rather than the desired actual conversion of the plastic into natural materials such as carbon dioxide ($CO_2$), water ($H_2O$), and/or methane ($CH_4$). Some jurisdictions such as the European Union and some states have adopted policies discouraging or even proposing banning the use of such additives or at least barring claims of biodegradability of plastics containing the additives because such claims are deemed misleading.

It is believed by such government agencies that OXO additives may simply accelerate break-up of the macro-structure of the plastic article itself due to exposure to UV light (from sun exposure) and/or oxygen. Such specialty plastics may not actually biodegrade to any appreciable degree within a given time frame (e.g., 5 years, 3, years, or 1 year), but simply lose strength, crack, and break up into small pieces. The result can be a pile of small pieces of polyethylene or other base plastic material that results as the bottle, film, or other article physically degrades over time due to the presence of the UV and/or OXO additives. However, the weight fraction of polyethylene or other base plastic material may remain substantially the same, with no significant biodegradation to base elements actually occurring. The degradation may be primarily physical, as the article becomes brittle, cracks, and breaks up into small pieces, leaving many small fragments of polyethylene or other base polymer. Application of the term "biodegradable" to such plastic materials may be considered a misnomer, as complete biodegradation of the polymeric material itself may not actually be occurring (e.g., where substantial fractions of the plastic would be degraded into $CO_2$, $CH_4$, $H_2O$, and the like).

In addition, makers of plastics said to be biodegradable may incorporate chemical degradation additives, such as the organic materials, that operate separately or in combination with the OXO additives to achieve some biodegradation. However, these additives also are considered by some to be of limited value because any biodegradation may be very slow. In addition, the composition of the additives is typically a trade secret, although some conclude the additives are similar or identical to those of the UV and/or OXO additives. Because of doubts that the chemical additives actually cause adequate biodegradation to base elements, some plastic industry associations and regulators similarly frown upon the inclusion of the so-called organic additives in plastic compositions especially with any claims that they cause true biodegradation.

The terms "OXO additive" and "UV additive" may be used herein interchangeably to refer to chemical agents that under exposure to oxygen or UV radiation cause disintegration of plastic polymer chains into fragments, with or without substantial biodegradation.

The term "chemical additive" is used herein to refer to materials, often organic, that may be mixed with plastic products to cause degradation and/or biodegradation of plastic materials by interacting with microbes in a disposal environment. The additives may operate with secretions of the microorganisms, such as enzymes or may provide nutrition that encourages growth and colonization of the microorganisms. Such a function may be described as "cell mediated" degradation or biodegradation.

The terms "degradation additive" is used herein to refer to either or both OXO additives and/or chemical additives that are mixed with plastics, such as polyolefins, e.g. polyethylene, polypropylene and the like to promote degradation of the polymer chains by oxidation and/or chemical attack and/or microbial dissimilation.

The term "biodegradation" as used herein refers to conversion of a polymer in whole or in part to base elements such as carbon dioxide, methane, and/or water.

SUMMARY

Applicant's copending application 15/691,588 discloses a method for lending biodegradability to plastic articles, that are typically not otherwise biodegradable, by addition of a fraction of a carbohydrate-based polymeric material (known commercially as NuPlastiQ® (available from Applicant) which has surprisingly been found to lend substantial biodegradability to such plastic materials when blended therewith and exposed to conditions where microbes are found in sufficient quantities such as are found in landfills, compost conditions and/or marine environments.

The present application is directed to compositions and methods for achieving enhanced biodegradability in blends of a conventional, substantially non-biodegradable plastic with a carbohydrate-based polymeric material such as NuPlastiQ® available from Applicant, by adding a degradation additive as described above to a blend of the carbohydrate based polymer and the non-biodegradable plastic. While the blends of the carbohydrate based polymer and the non-biodegradable plastic achieve substantial levels of biodegradability and even complete biodegradability, the presence of the degradation additive can significantly enhance the biodegradability (e.g., rate and/or extent) of such blends.

Accordingly, the present invention achieves the benefit of the combined effects of the prior art degradation additives and Applicant's NuPlastiQ material in biodegrading plastics such as polyethylene and other plastic polymers. Thus, while it is believed the presence of a degradation additive (such as an OXO additive) in conventional non-biodegradable plastics such as polyethylene and polypropylene, may cause degradation of plastics in the presence of ultra-violet light and/or oxygen, and which appears to result in the fragmentation and perhaps limited biodegradation (rather than substantially complete biodegradation), the presence of the degradation additive in plastic blends that include Applicant's starch-based composition known as NuPlastiQ®, in the presence of microorganisms along with ultraviolet light and/or oxygen, causes biodegradation of the plastic either faster or more completely than occurs with blends that do not include the additive. Similar results are achieved where an additive, often an organic additive such as those identified above, is included for its ability to interact with microorganisms that contribute to true biodegradation of polymeric plastic materials. Typically, the degradation additive is present in the blend at a concentration of from about 0.3% by weight to about 5% by weight of the final blend, depending on the potency of the additive, the final proportions of which can be readily determined by routine testing for effectiveness. The additive(s) may be incorporated with the NuPlastiQ prior to blending with the non-biodegradable plastic, blended with the non-biodegradable plastic prior to blending with NuPlastiQ or it may be added to a blend in which the non-biodegradable plastic and NuPlastiQ are being blended at the time that the plastic product is being manufactured. The degradation additive is introduced by any conventional extrusion or blending operation known for blending routine components, such as compatibilizers, antioxidants, etc. in the plastics industry.

The NuPlastiQ/biodegradable blends containing the foregoing additives may achieve a level of biodegradation (i.e., breakdown into carbon dioxide and/or methane and/or water) in landfill, marine, and/or compost environments, or even in discarded environments with sunlight exposure in the case of OXO additives, that is faster and sometimes more complete than a plastic without the degradation additive. The extent of biodegradation may be measured in various tests, e.g., including by ASTM D 5338 (anaerobic conditions such as landfills) and ASTM D 6400 (aerobic conditions, such as composting).

The compositions and methods of this invention demonstrate the ability to lend enhanced biodegradability to several plastic materials that prior to the development of NuPlastic® were believed not otherwise significantly biodegradable, examples of which may include, but are not limited to polyethylene, polypropylene, and other polyolefins such as polystyrene. This phenomenon also applies to other materials such as polyesters (polyethylene terephthalate), ABS, polyvinyl chloride, nylon, polycarbonate, and combinations thereof.

Blends of such plastics with the carbohydrate-based polymeric material, NuPlastiQ, and the degradation additive may be mixed and heated (e.g., melted) for use in forming extruded plastic products, injection molded plastic products, blow molded plastic products, blown film plastic products, extruded or cast sheet or films, thermoformed plastic products, and the like using standard equipment of the plastics industry from mixing and compounding the polymeric materials with necessary ingredients.

BRIEF DESCRIPTION OF THE DRAWINGS

In order that the manner in which the above-recited and other advantages and objects of the invention are obtained, a more particular description of the invention briefly described above will be rendered by reference to specific embodiments thereof such as illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

I. Definitions

Figure 1:
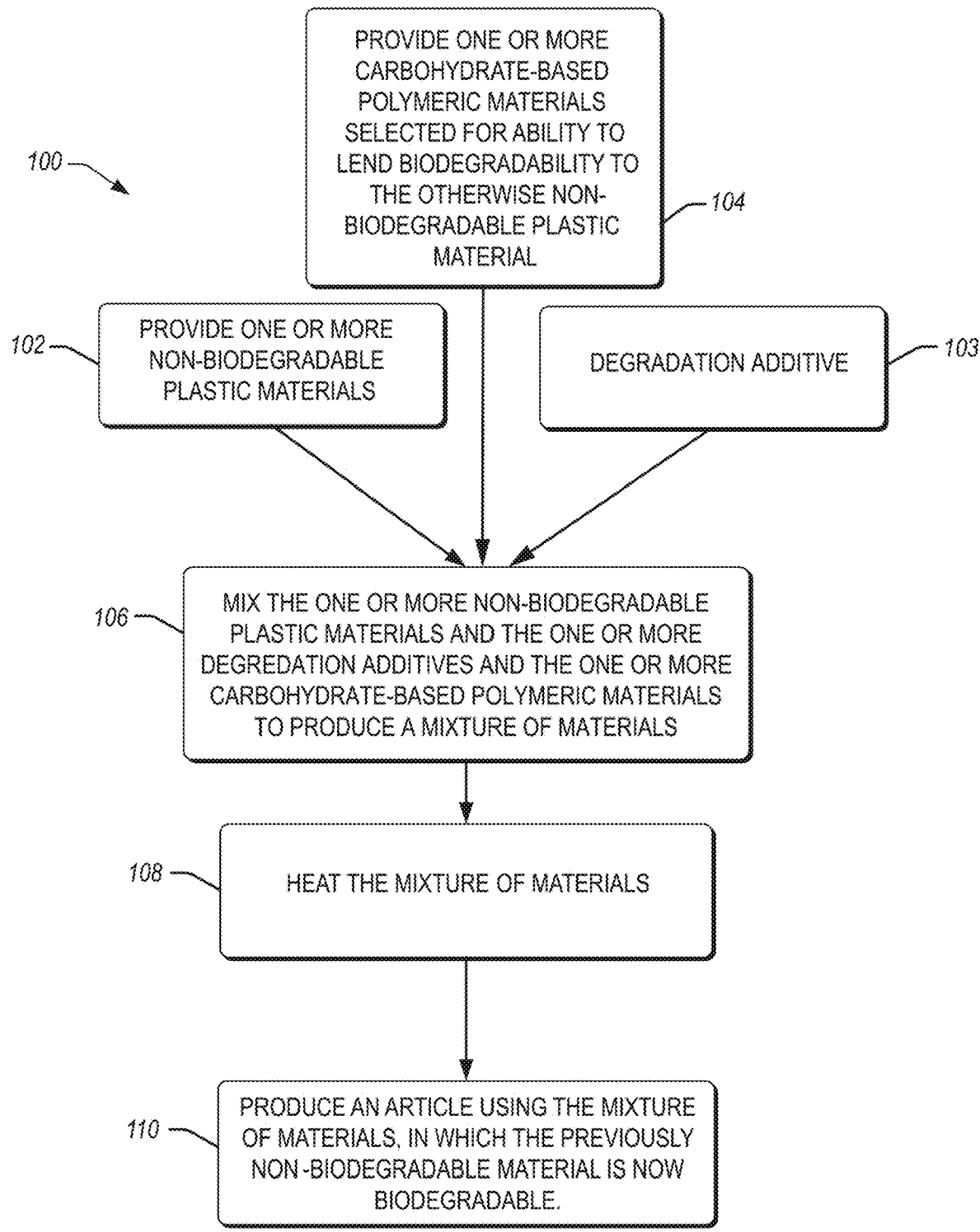
FIG. 1 illustrates a flow diagram of an exemplary process for forming an article from compositions of the present invention including a carbohydrate-based polymeric material (NuPlastiQ) and one or more degradation additives. As shown, the carbohydrate-based polymer and the degradation additive are mixed with the non-biodegradable plastic at 104; however, the additive may be premixed with either material prior to preparing the mixture of all three ingredients.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

The terms "a," "an," "the" and similar referents used in the context of describing the inventive features (especially in the context of the following claims) are to be construed to cover both the singular and the plural, unless otherwise indicated herein or clearly contradicted by context. Thus, for example, reference to a "starch" can include one, two or more starches.

"Film," as used herein, refers to a thin continuous article that includes one or more polymeric materials that can be used to separate areas or volumes, to hold items, to act as a barrier, and/or as a printable surface.

"Bag," as used herein, refers to a container made of a relatively thin, flexible film that can be used for containing and/or transporting goods.

"Bottle," as used herein, refers to a container that can be made from the presently disclosed plastics, typically of a thickness greater than a film, and which typically includes a relatively narrow neck adjacent an opening. Such bottles may be used to hold a wide variety of products (e.g., beverages, personal care products such as shampoo, conditioner, lotion, soap, cleaners, and the like).

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 25%, 15%, 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 25% of, within 15% of, within 10% of, within 5% of, or within 1% of, a stated amount or value.

Some ranges are disclosed herein. Additional ranges may be defined between any values disclosed herein as being exemplary of a particular parameter. All such ranges are contemplated and within the scope of the present disclosure. Further, recitation of ranges of values herein is intended to serve as a shorthand method of referring individually to each separate value falling within the range. Unless otherwise indicated herein, each individual value is incorporated into the specification as if it were individually recited herein.

All numbers expressing quantities of ingredients, constituents, conditions, and so forth used in the specification and claims are to be understood as being modified in all instances by the term "about". Notwithstanding that the numerical ranges and parameters setting forth the broad scope of the invention are approximations, the numerical values set forth in the specific example& are reported as precisely as possible. Any numerical value, however, inherently contains certain errors necessarily resulting from the standard deviation found in their respective testing measurements.

The phrase 'free of' or similar phrases as used herein means that the composition comprises 0% of the stated component, that is, the component has not been intentionally added to the composition. However, it will be appreciated that such components may incidentally form under appropriate circumstances, may be incidentally present within another included component, e.g., as an incidental contaminant, or the like.

The phrase 'substantially free of' or similar phrases as used herein means that the composition preferably comprises 0% of the stated component, although it will be appreciated that very small concentrations may possibly be present, e.g., through incidental formation, incidental contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%.

The term "non-biodegradable" as used herein with regard to a material means that the material (free of additives added to render it biodegradable) does not degrade (particularly biodegrade), e.g., to carbon dioxide or methane to a significant extent in a limited time period (e.g. one year, 3 years, or 5 years) when exposed to various typical disposal conditions, such as sunlight, in the ocean, or in a landfill. However, it is understood that given enough time and exposure to conditions of sunlight, oxygen and degrading microbes, most polymeric materials (e.g., even those that are typically considered "non-biodegradable") will eventually degrade or even biodegrade, usually to some limited extent, over an extended time (e.g., decades or centuries).

The term "biodegradable" as used herein with regard to a material means that the material which contains NuPlastiQ in the presence of biodegradation additives as described herein does biodegrade to base elements such as carbon dioxide, methane and/or or water.

II. Introduction

The present disclosure is directed to, among other things, methods for lending biodegradability to a plastic material that itself is not otherwise biodegradable by blending such plastic material with (a) a carbohydrate-based (e.g., starch-based) polymeric material, that is specifically selected for its ability to lend biodegradability to the plastic material that is not itself biodegradable, and (b) a degradation additive. The carbohydrate-based polymeric material is known as "NuPlastiQ" and is available from Applicant. The method includes treatment appropriate to the additive, such as exposure to oxygen, radiation by UV, and inclusion of the degradation additive under conditions that the additive is activated in the presence of biodegrading microbes. The degradation additive is one or more of: (i) a material known in the art as an OXO additive (which functions to facilitate degradation by oxygen and/or UV, and/or (ii) a chemical composition known to attract, colonize, and/or interact with (such as by providing nutrition and/or reacting with secretions e.g., enzymes) of microorganisms, which microorganisms promote or cause degradation of the plastics mentioned in an environment conducive to such biodegradation, such as the soil, a compost environment and/or landfill. Such methods are particularly beneficial in that they allow numerous plastic items that are thrown out to be biodegraded in a landfill, compost pile or similar disposal environment, rather than continuing to exist in their polymeric, stable state, indefinitely.

Furthermore, biodegradation of such articles does not readily occur where the articles are stored in typical storage and use environments (e.g., stored in a home, office, warehouse, or the like), but biodegradation generally only begins to occur where the article is placed in an environment that simulates or is that of a landfill or compost or other typical disposal environment where microorganisms facilitating degradation are present. For example, such conditions may include (i) a temperature that is somewhat elevated above normal ambient "use" or "storage" temperatures, (ii) exposure to elevated moisture levels, (iii) exposure to particular classes of microbes indigent to landfills or compost and similar disposal environments, or marine/ocean environments. Elevated temperature and moisture will not cause biodegradation of such articles unless the necessary microorganisms are also present. The combination of such conditions causes the articles formed from such a blend of materials to begin to biodegrade.

While the mechanisms by which such biodegradation of typically non-biodegradable polymers becomes possible upon blending with the carbohydrate-based polymeric material and one or more degradation additives may not be understood, it is believed that blending the two plastic materials together, coupled with perhaps particular characteristics of the carbohydrate-based polymeric material (NuPlastiQ) which intimately mixes with the non-biodegradable material, causes breakage of the polymeric chains of the plastic by microorganisms which attack the polymer bonds. The presence of suitable microbes somehow breaks the hygroscopic barrier associated with the non-biodegradable plastic materials, allowing the microbes that would biodegrade the carbohydrate material to not only biodegrade the carbohydrate-based polymeric material, but also to biodegrade the adjacent normally non-biodegradable plastic molecules as well. The carbon bonds are broken and the biodegradation can be confirmed based on tests that capture and measure the carbon dioxide and/or methane that is off-gassed. Such results are surprising, unexpected, and particularly advantageous. The degradation additives described heroin operate within this environment to enhance the function of the microorganisms and/or render the plastic material in a form that it may more suitably be attacked by the microorganisms.

Articles can be produced by mixing the carbohydrate-based polymeric material and one or more degradation additives with the otherwise non-biodegradable plastic material, in any order, heating the mixture, and molding (e.g., injection molding) the mixture, extruding the mixture, blow molding the mixture, blow-forming the mixture (e.g., forming a blown film), thermoforming the mixture, or the like. Also contemplated is mixing the carbohydrate material and the non-biodegradable material, without the degradation additive, to form a blend of the components without the additive, and subsequently adding the degradation additive in amounts described herein to the blend of the carbohydrate material and the non-biodegradable plastic at a point prior, perhaps just prior, to manufacturing a plastic product such as a film or injection molded part. Various other plastic manufacturing processes will be apparent to those of skill in the art in light of the present disclosure.

The articles described herein can be produced in the form of any conceivable structure, including, but not limited to bottles, boxes, other containers, sheets, films, bags, and the like. Thin films for bags and film wraps (e.g., for wrapping around or over a product) can easily be made using blown film equipment.

Examples of suitable carbohydrate-based or starch-based polymeric materials that have been shown to lend biodegradability to otherwise non-biodegradable plastic materials for use in forming such articles are available from BioLogiQ, under the tradenames "NuPlastiQ," and formerly "ESR" ("Eco Starch Resin"). Specific examples of NuPlastiQ include, but are not limited to NuPlastiQ GP, NuPlastiQ XP, NuPlastiQ XD, NuPlastiQ BC, NuPlastiQ MB and NuPlastiQ BC. Under the tradename ESR, such materials have previously been referred to as GS-270, GS-300, and GS-330. Specific characteristics of such NuPlastiQ materials will be described in further detail herein. Other carbohydrate-based or starch-based polymeric materials may also be suitable for use so long as they are capable of, and specifically selected for the purpose of lending biodegradability to plastic materials that are otherwise not biodegradable. NuPlastiQ is further described in applicant's copending applications Ser. Nos. 15/481,806 and 15/481,823 both filed on Apr. 7, 2017 and which are incorporated by reference in their entirety herein.

Examples of suitable degradation additives are materials known in the art to, under conditions of exposure to ultraviolet light and/or oxygen, degrade or fragment to some extent polymeric materials such as polyethylene, polypropylene, other polyolefins, polyethylene terephalate, other polyesters, polystyrene, ABS, polyvinyl chloride, nylon and polycarbonate. Representative additives are OXO additives (e.g., such as PDQ-M, PDQ-H, BDA, and OxoTerra™ from Willow Ridge Plastics, and OX1014 from Lifeline). With such additives, photooxidation is generally the triggering step in the oxidation process. UV radiation leads to active radical formation which in turn may lead to cleavage of C—C bonds. In general the OXO additives are salts of transition metals such as cobalt, iron, manganese, magnesium, nickel and/or zinc, although other transition metals may be used. OXO additives do not include heavy metals such as lead, mercury or cadmium. Suitable salts include the salts of carboxylic acids and dithiocarbamates, although other salts such as halides (e.g., chlorides), nitrates, sulfates, acetates, chlorates and the like are possible. Some of such OXO additives are described in "Transition Metal Salts," published by the OXO-biodegradable Plastic Association and incorporated herein in its entirety by reference, http://www.biodeg.biode.org/Transition%20Metal%20Salts%201.pdf., and Noreen L. Thomas, Andrew R. McLauchlin, Jane Clarke, and Stuart G. Patrick, "Oxo-degradable plastics: degradation, environmental impact and recycling", Institute of Civil Engineering, Waste and Resource Management, volume 165, Issue WR3, https://dspace.lboro.ac.uk/dspace-jspui/bitstream/2134/13941/4/warm165-133.pdf, incorporated herein by reference in its entirety. The OXO additives are typically used in an amount ranging from about 0.3% to 5% by weight of the final carbohydrate-based polymer/plastic blend, depending on their potency, and the optimum level can readily be determined by routine testing. Representative amounts include not more than 0.3%, not more than 1%, not more than 1.5%, not more than 2%, not more than 2.5%, less than 5%, less than 3%, less than 2%, or less than 1% of the final blend of the NuPlastiQ or other carbohydrate-based polymeric material and non-biodegradable plastic.

Suitable other similar OXO type degradation additives that facilitate degradation of plastics in the presence of ultra-violet light, and in some cases, visible light, are titanium dioxide, including $TiO_2$ having grafted thereto poly (methyl methacrylate) (PMMA) as described in Ying Luo, Xianming Dong, and Chaoqun Zhang, "Accelerating the degradation of polyethylene composite mulches," Plastics Research online, 19 May 2017, incorporated herein in its entirety by reference; copper phthalocyanine (CuPc) sensitized $TiO_2$ photocatalyst used in polyethylene as described in Jing Shang, Ming Chai and Yougfa Zhu, "Photocatalytic Degradation of Polystyrene Plastic under Fluorescent Light," Environ. Sci. Technol. 2003, 37 (19), pp 4494-4499, incorporated entirely herein by reference; ceria (annealed at elevated temperatures), zinc oxide annealed at temperatures of about 250° C., and copper sulfide photocatalysts, as described in Apeksha Gupta, Y. N. Lakshmi, R. Manivannan, S. Noyel Victoria, "Visible Range Photocatalysts for Solid Phase Photocatalytic Degradation of Polyethylene and Polyvinyl Chloride, JCChems, vol 62, No 1 (2017) (incorporated herein in its entirety by reference); and finally, vanadium(III) acetyl acetonate (VAc), serpentine and Cloisite 30B(CL) as described in Zehra Oluz and Teoman Tincer, "Additives for ultraviolet-induced oxidative degradation of low-density polyethylene," Applied Polymer Science, Wiley Online Library, 18 Jan. 2016, incorporated herein in entirety by reference. These materials are typically used in the amounts set forth above.

The OXO additives are typically effective under conditions of oxygen and UV light exposure.

Other suitable degradation additives to be used in combination with applicant's NuPlastic® or another carbohydrate-based polymeric material as described herein are materials conducive to growth and activity of microorganisms known to produce, e.g., secrete, substances such as enzymes that attack plastics such as polyethylene and/or other polymers such as polyvinyl chloride. Examples are organic chemical additives such as Restore® from Enso, EcoPure® by Bio-Tec Environmental, ECM Masterbatch Pellets 1M by ECM Biofilms, Biodegradable 201, Biodegradable 302 from Biosphere,™ and TDPA™ available from EPI Environmental Technologies, Inc. Typically, these additives are compositions, often organic, and known to nurture and multiply useful organisms in biodegradability environments. Such materials are known to promote microbial action such as by reaction with enzymes secreted by the microorganisms and/or to provide a food source for microorganisms causing them to colonize and multiply. These materials enhance biodegradation of polymers, e.g., polyolefins, through mechanisms such as hydrolysis, methanogenesis and acetogenesis.

Some microbes which multiply in the presences of the chemical additives, typically organic materials, secrete enzymes such as laccase, amylase, or lipase that act on the carbon-carbon bonds of polymers, or otherwise facilitate breakdown of plastic molecules that can be more completely biodegraded when blended with applicant's NuPlastiQ. A representative fungi that contributes needed enzymes to this phenomenon is *Cochliobolus* sp. Examples of organic carbohydrate degradation additives that contribute to production of an enzyme, laccase, from such fungi are sugars such as maltose, lactose, xylose, glucose, and galactose. Nitrogen sources such as peptone, urea, ammonium nitrate, yeast extract and ammonium sulfate may also be added to cultures producing laccase. Laccase is known to facilitate the breakdown of polyvinyl chloride. The function of the aforementioned materials in encouraging the growth of the enzyme laccase from the microorganisms *Aspergillus niger* and *Lysinibacillus eylanilyticus* SD B9 (T) to degrade polyvinyl chloride can be found in Tirupati Sumathi, Buddolla Viswanath, Akula Sri Lakshmi and D. V. R. SaiGopal, "Production of Laccase by *Cochliobolus* sdp. Isolated from Plastic Dumped Soils and Their Ability to Degrade Low Molecular Weight PVC", incorporated herein in its entirety by reference; and Biochemistry Research International, 2016; 9519527 incorporated by reference herein in its entirety. The action of the microorganisms, *Aspergiillus niger* and *Lysinibacillus xylanilyticus* cultured in growth media containing ammonium nitrate, magnesium sulfate, potassium hypophosphate, calcium chloride and potassium chloride, followed by treatment with glucose, malt extract, peptone, asparagine, magnesium sulfate, potassium hypophosphate, and thiamine hydrochloride to degrade polyethylene, with and without UV radiation, is discussed by Atefeh Esmaeili, Ahmad Ali Pourbabaee, Hossein Ali Alikhani, Farzin Shabani Ensieh Esmaeili in "Biodegradation of Low-Density Polyethylene (LDPE) by Mixed Culture of *Lysinibacillus xylanilyticus* and *Aspergillus niger* in Soil," Plos One, published Sep. 23, 2013, incorporated by reference herein in its entirety.

A discussion of other bacteria and fungi that are known to be active in the biodegradation of polyethylene and polypropylene can be found at Sudhakar, Arkatkar, Doble, Bhaduri and Uppara, Biodegradation of polyethylene and polypropylene, Indian journal of Biotechnology, Vol 7, January 2008, pp 9-22.

The chemical additives described above may be used in an effective amount depending on their individual activity, typically about 0.3% to 5% by weight of the non-biodegradable plastic material in the blend, or of the blend as a whole, although other amounts may be used depending on their potency in achieving the desired biodegradation result. The chemical additives may be effective in anaerobic conditions such as landfills and ocean environments.

The blends of this invention may also be significantly biodegradable in ocean environments where degradation additives known to nurture necessary microbes for biodegradation in the oceans are included in the blends.

Also contemplated according to this invention is the presence in the blends of both types of additives, that is both the OXO and the chemical additive may be present in the NuPlastiQ/non-biodegradable plastic blends. It is hypothesized that the mechanism of biodegrading plastics according to this invention is first breaking down the long polymer chains of the plastic followed by assimilation of the smaller constituent molecules by microbes. The combined action of the NuPlastiQ material with an OXO additive followed by assimilation by microbes nurtured by microbe nutrient degradation additives as described herein encourages this mechanism in a wide range of environments, landfills, compost and ocean. Such a process is sometimes referred to as "cell mediation."

The additives may be added by standard methods of mixing additives in the plastics industry, such as by mixing with the carbohydrate-based polymer prior to making the final blend, mixing into the non-biodegradable plastic material prior to blending or may be mixed into the combined blend of the carbohydrate based polymer/non-biodegradable plastic. The additives also may be incorporated into a master batch, such as with the carbohydrate-based polymer prior to blending with the plastic based polymer. Applicant provides masterbatch blends of NuPlastiQ and conventional plastic materials under the tradename BioBlend, e.g., including, but not limited to, BioBlend XP, BioBlend XD, and BioBlend BC.

In non-biodegradable plastic/NuPlastiQ blends containing one or more of the degradation additive(s), a substantial portion or all of the carbon atoms in the blended product can be converted by microorganisms into $CO_2$ and or $CH_4$. The rate of conversion depends on several factors such as thickness of the part, number of microorganisms, type of microorganisms, ratio of $C^{12}$ (fossil fuel sourced material) and $C^{14}$ (renewably sourced material) in the product, type of plastics in the blend, the strength of the carbon bonds in the plastic, etc.

While blends of NuPlastiQ and polyolefins are biodegradable without further additives, in general the presence of a degradation additive as described herein may enhance the biodegradation of the blended plastic products by increasing the rate and amount of disintegration or fragmentation of the blend. OXO additives are thought to work by causing the disintegration of the macro-structure of the plastic components in the presence of oxygen or ultraviolet light. Increasing the rate and extent to which the carbon bonds are broken down into smaller fragments is thought generally to enable microorganisms present to more readily dissimilate the plastic. When the molecular weight of the carbon chains is reduced and surface area increased, microorganisms may more easily access and consume the materials. The chemical additives are thought to contribute to biodegradation by attracting microorganisms that consume or generate enzymes that break down the plastic materials, with generation of off-gases such as carbon dioxide. Both types of degradation additives enhance the effects of NuPlastiQ in degrading polymer chains.

Plastic products that contain merely the degradation additives without the presence of the carbohydrate based material, NuPlastiQ, may begin to fragment or disintegrate when they are subjected to an environments where oxygen and/or light and/or helpful microbes are present in sufficient concentration to cause disintegration of the plastic. However, true substantial biodegradation is often unlikely to occur and the degradation additive of itself might not be able to have the desired effect of causing enough biodegradation into base elements such as carbon dioxide and methane. But if the product is made using NuPlastiQ®, then the plastic would still be able to biodegrade in anaerobic conditions or conditions without light, and the presence of the degradation additives are believed to enhance the rate and extent of true biodegradation.

III. Exemplary Articles and Methods

FIG. 1 illustrates an exemplary process 100 that may be used to lend biodegradability to a plastic material that itself is not otherwise biodegradable. At 102, the process 100 can include providing one or more non-biodegradable plastic (e.g., polymeric) materials (e.g., including, but not limited to polyethylene, polypropylene, other polyolefins, polystyrene, ABS, polyvinyl chloride, nylon, or polycarbonate). At 104, the process 100 can include providing one or more carbohydrate-based polymeric materials, such as NuPlastiQ, specifically selected for inclusion in the blend for its recognized ability to lend biodegradability to the otherwise non-biodegradable plastic material provided at 102. The carbohydrate-based polymeric materials and the otherwise non-biodegradable plastic materials can be provided in a desired form, such as pellets, powders, curdles, slurry, and/or liquids. In specific embodiments, the materials can be in the form of pellets.

The method further includes blending the plastic material with the carbohydrate-based polymeric material prior to blending with the non-biodegradable plastic At 106 the degradation additive is mixed into the carbohydrate polymer and non-biodegradable plastic, although as mentioned, the additive may be provided to either polymeric component prior to blending or to the final blend of the carbohydrate-based polymer/plastic blend.

Such simple blending surprisingly renders the plastic blended material biodegradable, where such material typically does not previously exhibit such a characteristic. Such blends are also biodegradable to an extent greater than the amount of just the carbohydrate-based material indicating that the normally non-biodegradable plastic is also biodegrading. As a result, the blend of such materials is fully biodegradable, and articles formed from such a blend are similarly biodegradable. By way of example, although polyethylene itself is not biodegradable, Applicant has discovered that blending polyethylene with the NuPlastiQ carbohydrate-based polymeric materials having characteristics as described herein and the degradation additive, lends biodegradability to the polyethylene, so that not only does the carbohydrate-based polymeric material biodegrade, but the polyethylene blended therewith also becomes biodegradable as a result of its blending with the carbohydrate-based polymeric material and the additive.

Such blends may be formed in manufacture into a desired article through any conceivable process. An example of such would be an extrusion process. For example, the non-biodegradable plastic material and the carbohydrate-based polymeric material selected for its ability to lend biodegradability plus degradation additive can be fed into an extruder (e.g., into one or more hoppers thereof). The different materials can be fed into the extruder into the same chamber, into different chambers, at approximately the same time (e.g., through the same hopper), or at different times (e.g., through different hoppers, one being introduced into the extruder earlier on along the screw than the other), etc. It will be apparent that many blending possibilities are possible.

In some cases, the non-biodegradable plastic material can include a polyolefin. For example, such plastic materials may include, but are not limited to polyethylene, polypropylene, other polyolefins, polyester, polystyrene, ABS, polyvinyl chloride, nylon, polycarbonates, and the like. Such plastic material may be sourced from petrochemical sources, or from so-called "green" or sustainable sources (e.g., "green" PE, bioPET, and the like).

The carbohydrate-based polymeric materials can be formed from a plurality of materials (e.g., a mixture) including one or more starches. For example, the one or more starches can be produced from one or more plants, such as corn starch, tapioca starch, cassava starch, wheat starch, potato starch, rice starch, sorghum starch, and the like. In some embodiments, a mixture of different types of starches may be used, which Applicant has found to result in a synergistic increase in strength. A plasticizer may also be present within the mixture of components from which the carbohydrate-based polymeric materials are formed. Water may also be used in forming the carbohydrate-based polymeric material, although only a small to negligible amount of water is present in the finished carbohydrate-based polymeric material.

The one or more carbohydrate-based polymeric materials can be formed from mostly starch. For example, at least 65%, at least 70%, at least 75%, or at least 80% by weight of the carbohydrate-based polymeric material may be attributable to the one or more starches. In an embodiment, from 65% to 90% by weight of the finished carbohydrate-based polymeric material may be attributed to the one or more starches. Other than negligible water content, the balance of the finished carbohydrate-based polymeric material may be attributed to a plasticizer (e.g., glycerin). The percentages above may represent starch percentage relative to the starting materials from which the carbohydrate-based polymeric material is formed, or that fraction of the finished carbohydrate-based polymeric material that is derived from or attributable to the plasticizer (e.g., at least 65% of the carbohydrate based polymeric material may be attributed to (formed from) the starch(es) as a starting material). Although some water may be used in forming the carbohydrate-based polymeric material, substantially the balance of the carbohydrate-based polymeric material may be attributed to glycerin, or another plasticizer. Very little residual water (e.g., less than 2%, typically no more than about 1%) may be present in the finished carbohydrate-based polymeric material.

For example, the materials from which the one or more carbohydrate-based polymeric materials are formed can include at least 12%, at least 15%, at least 18%, at least 20%, at least 22%, no greater than 35%, no greater than 32%, no greater than 30%, no greater than 28%, or no greater than 25% by weight of a plasticizer. Such percentages may represent that fraction of the finished carbohydrate-based polymeric material that is derived from or attributable to the plasticizer (e.g., at least 12% of the carbohydrate based polymeric material may be attributed to (formed from) the plasticizer as a starting material).

Exemplary plasticizers include, but are not limited to glycerin, polyethylene glycol, sorbitol, polyhydric alcohol plasticizers, hydrogen bond forming organic compounds which do not have a hydroxyl group, anhydrides of sugar alcohols, animal proteins, vegetable proteins, aliphatic acids, phthalate esters, dimethyl and diethylsuccinate and related esters, glycerol triacetate, glycerol mono and diacetates, glycerol mono, di, and tripropionates, butanoates, tearates, lactic acid esters, citric acid esters, adipic acid esters, stearic acid esters, oleic acid esters, other acid esters, or combinations thereof. Glycerin may be preferred.

The finished carbohydrate-based polymeric material may include no greater than 5%, no greater than 4%, no greater than 3%, no greater than 2%, no greater than 1.5%, no greater than 1.4%, no greater than 1.3%, no greater than 1.2%, no greater than 1.1%, or no greater than 1% by weight water. The NuPlastiQ materials available from BioLogiQ are examples of such finished carbohydrate-based polymeric materials, although it will be appreciated that other materials available elsewhere (e.g., at some future time) may also be suitable for use.

In some embodiments, mixtures of different starches may be used in forming the carbohydrate-based polymeric material. Use of such a mixture of different starches (e.g., coming from different plants) has been found to surprisingly be associated with a synergistic increase in strength in articles including such carbohydrate-based polymeric materials. In such a mixture of starches, a starch can be present in the mixture in an amount of at least 1%, at least 2%, at least 3%, at least 4%, at least 5%, at least 10%, at least 15%, at least 20%, at least 25%, at least 30%, at least 35%, at least 40%, no greater than 95%, no greater than 90%, no greater than 85%, no greater than 80%, no greater than 75%, no greater than 70%, no greater than 65%, no greater than 60%, no greater than 55%, no greater than 50%, or from 10% to 50% by weight relative to the combined weight of the plurality of starches. Some non-limiting exemplary mixtures may include 90% of a first starch, and 10% of a second starch, or 30% of a first starch and 70% of a second starch, or 50% of a first starch and 50% of a second starch. Mixtures of more than two starches (e.g., using 3 or 4 different starches) can also be used.

Examples of suitable carbohydrate-based (e.g., starch-based) polymeric materials for use in forming films and other articles are available from BioLogiQ, located in Idaho Falls, Idaho, under the tradename NuPlastiQ. Specific examples include, but are not limited to NuPlastiQ GP, NuPlastiQ XP, NuPlastiQ XD, and NuPlastiQ BC. Additional details relative to fractions of starch and glycerin or other plasticizers used in forming NuPlastiQ are described in Applicant's other patent applications, already incorporated herein by reference. NuPlastiQ may be provided in pellet form. Physical characteristics for two examples of NuPlastiQ materials, previously referred to as GS-270 and GS-300, are shown in Table 1 below.

TABLE 1

| PROPERTY | TEST METHOD | GS-270 NOMINAL VALUE | GS-300 NOMINAL VALUE |
|---|---|---|---|
| Density | ASTM D-792 | 1.40 g/cm$^3$ | 1.42 g/cm$^3$ |
| THERMAL PROPERTIES | | | |
| Melt Flow Index 200° C./5 kg | ASTM D-1238 | 1.98 g/10 min | 1.95 g/10 min |
| Melting Temp. Range | ASTM D-3418 | 166-180° C. | 166-180° C. |
| Glass Transition Temp. | ASTM D-3418 | 81-100° C. | 81-100° C. |
| MECHANICAL PROPERTIES | | | |
| Tensile Strength @ Yield | ASTM D-638 | >30 MPa | >14 MPa |
| Tensile Strength @ Break | ASTM D-638 | >30 MPa | >14 MPa |
| Young's Modulus | ASTM D-638 | 1.5 GPa | 1.5 GPa |
| Elongation at Break | ASTM D-638 | <10% | <10% |
| Impact Resistance (Dart) | ASTM D-5628 | 3.5 kg | 4.5 kg |
| ADDITIONAL PROPERTIES | | | |
| Water Content | ASTM D-6980 | ≤1.5%, or ≤1% | ≤1.5%, or ≤1% |

The above characteristics shown for GS-270 and GS-300 are exemplary of other NuPlastiQ products available from BioLogiQ, although values may vary somewhat. For example, NuPlastiQ products from BioLogiQ may generally have a glass transition temperature ranging from about 70° C. to about 100° C. Those of skill in the art will appreciate that glass transition temperature can be indicative of degree of crystallinity. Values for melting temperature range, density, Young's Modulus, and water content may be identical or similar to those shown above in Table 1. Some characteristics may similarly vary somewhat (e.g., ±25%, or ±10%) from values shown for GS-270 and GS-300. NuPlastiQ has an amorphous structure (e.g., more amorphous than typical raw starch). For example, typical raw starch powder has a mostly crystalline structure (e.g., greater than 50%), while NuPlastiQ has a mostly amorphous structure (e.g., less than 10% crystalline).

The NuPlastiQ materials have a low water content, as described. As this material absorbs moisture, it exhibits plastic behavior and becomes flexible. When removed from a humid environment, the material dries out and becomes stiff again (e.g., again exhibiting less than about 1% water content). The moisture present in NuPlastiQ (e.g., in pellet form) may be released in the form of steam during processing such as that shown in FIG. 1. As a result, films or other articles produced from a starch-based polymeric material blended with a non-biodegradable plastic material may exhibit even lower water content, as the non-biodegradable plastic material typically will include no or negligible water, and the water in the NuPlastiQ may typically be released during manufacture of a desired article.

Low water content in the carbohydrate-based NuPlastiQ polymeric material can be important, as significant water content can result in incompatibility with the non-biodegradable plastic material, particularly if the article requires formation of a thin film. For example, as the water vaporizes, this can result in voids within the film or other article, as well as other problems. When blowing a thin film, the carbohydrate-based polymeric material used may preferably include no more than about 1% water.

Low water content is not achieved in the NuPlastiQ material through esterification, as is common in some conventional TPS materials that may include relatively low water content. Such esterification can be expensive and complex to perform. Furthermore, the NuPlastiQ materials that are exemplary of the carbohydrate-based polymeric materials employable herein also typically do not themselves actually include any identifiable starch, or identifiable glycerin, as such, as the starting materials of the carbohydrate-based polymeric material have been mechanically, physically or chemically reacted and/or altered. X-ray diffraction patterns of exemplary carbohydrate-based polymeric materials as described below (e.g., and shown in FIG. 3) evidence such chemical or physical alteration, showing that the finished polymeric material may be substantially devoid of starch in such identifiable, native form. In other words, the carbohydrate-based polymeric material is not always recognized as a mixture including starch and glycerin. The low water content achievable in the carbohydrate-based polymeric material is believed to be due at least in part to the physical or chemical alteration of the starch and plasticizer materials into a thermoplastic polymer, which does not retain water as would native starch, or conventional thermoplastic starches.

Returning to FIG. 1, processing at relatively high temperatures may result in some release of volatized glycerin (e.g., visible as smoke). If needed (e.g., where stored pellets may have absorbed additional water), drying of pellets can be performed by simply introducing warm dry air, e.g., at 60° C. for 1-4 hours, which is sufficient to drive off any absorbed water. Pellets should be dried to less than about 1% moisture content prior to processing, particularly if forming a film. NuPlastiQ pellets may simply be stored in a sealed container with or without a desiccant in a dry location, away from heat to minimize water absorption, and to prevent undesired degradation.

In addition to NuPlastiQ being thermoplastic, the NuPlastiQ may also be thixotropic, meaning that the material is solid at ambient temperature, but flows as a liquid when heat, pressure and/or frictional movement are applied. Advantageously, pellets of NuPlastiQ can be used the same as petrochemical based pellets (any typical non-biodegradable plastic resin pellets) in standard plastic production processes. NuPlastiQ materials and products made therefrom may exhibit gas barrier characteristics. Products (e.g., films) made using such pellets exhibit oxygen gas barrier characteristics (e.g., see Examples of Applicant's previous filings, already incorporated by reference). NuPlastiQ materials may be non-toxic and edible, made using raw materials that are all edible. NuPlastiQ and products made therefrom may be water resistant, but water soluble. For example, NuPlastiQ may resist swelling under moist heated conditions to the point that pellets (e.g. with a size of 3-4 mm) thereof may not completely dissolve in boiling water within 5 minutes, but a pellet will dissolve in the mouth within about 10 minutes. NuPlastiQ may be stable, in that it may not exhibit any significant retro gradation, even if left in relatively high humidity conditions, which characteristic differs from many other thermoplastic starch materials. Of course, products made with NuPlastiQ may also exhibit such characteristics. If NuPlastiQ is stored in humid conditions, the excess absorbed water can simply be evaporated away, and once the water content is no more than about 1%, it can be used in forming a film or other article.

The NuPlastiQ material also does not typically undergo biodegradation under typical storage conditions, even in relatively humid conditions, as the other conditions typical of a landfill, compost or similar disposal environment containing the particular needed microorganisms are not present. Of course, where such conditions are present, not only does the NuPlastiQ biodegrade, but otherwise non-biodegradable plastic materials blended therewith surprisingly also biodegrade.

NuPlastiQ can be cost competitive, being manufactured at a cost that is competitive with traditional polyethylene plastic resins. NuPlastiQ can be mixed with other polymers, including, but not limited to PE, PP, PET, polyester, polystyrene, acrylonitrile butadiene styrene (ABS), polyvinyl chloride, nylon, and others. While the above non-biodegradable polymers can be rendered biodegradable by blending with NuPlastiQ, it will be appreciated that NuPlastiQ can also be blended with polymers that already are biodegradable and/or compostable, such as polylactic acid (PLA), poly(butylene adipate-co-terephthalate) (PBAT), polybutylene succinate (PBS), polycaprolactone (PCL), polyhydroxyalkanoates (PHA), other so-called thermoplastic starches, as well as various others. PBS, PCL, and PHA are polyesters. EcoFLEX™ plastic, PBAT, is an example of a plastic material with which the NuPlastiQ carbohydrate-based polymeric material may be blended. For example, the present methods are not limited to blending the carbohydrate-based polymeric material (e.g., NuPlastiQ) with only a non-biodegradable plastic material, as it will be appreciated that biodegradable plastics (other than NuPlastiQ) can also be incorporated into the blend, if desired.

By way of further explanation, PLA is compostable, meaning that it can degrade under elevated temperature conditions (i.e., composting conditions), but is technically not "biodegradable". Some of the above listed materials, such as PBS, PCL, and PHA may be both biodegradable and compostable. EcoFLEX™ (PBAT) is certified as compostable. FTC Green guidelines stipulate that a plastic cannot make an unqualified claim that it is "degradable" unless it will degrade within a "reasonably short period of time" (most recently defined as within 5 years) "after customary disposal".

In some embodiments, the NuPlastiQ could be provided in a masterbatch formulation that may include the carbohydrate-based polymeric material and one or more of the degradation additives as described above, and an amount of one or more compatibilizers. The masterbatch may also include one or more non-biodegradable plastic materials. Such masterbatch formulation pellets could be mixed with pellets of the non-biodegradable plastic material at the time of processing. Any conceivable ratios may be used in mixing such different pellets, depending on the desired percentage of NuPlastiQ and/or compatibilizer and/or conventional non-biodegradable plastic material in the finished article. Or a masterbatch comprising the non-biodegradable plastic and one or more of the degradation additives may be provided.

NuPlastiQ includes very low water content. For example, although raw starch (e.g., used in forming NuPlastiQ) may typically include about 13% water by weight, the finished NuPlastiQ pellets available from BioLogiQ include less than about 1% water. NuPlastiQ materials are biodegradable, and as described herein, not only is the starch-based NuPlastiQ material biodegradable, but when blended with other polymers, such as non-biodegradable PE, PP, PET, polyester, polystyrene, ABS, polyvinyl chloride, nylon, and other non-biodegradable plastic materials, the blended material which includes NuPlastiQ and the one or more degradation additives becomes substantially entirely biodegradable, particularly when the degradation additives as described herein are present. Such results are quite surprising, and particularly advantageous. Typical thermoplastic starch materials do not exhibit such characteristics when blended with other plastic materials.

The NuPlastiQ materials described as suitable for use herein as the carbohydrate-based (e.g., starch-based) polymeric material are substantially amorphous. For example, raw starch powder (e.g., such as is used in making NuPlastiQ and various other thermoplastic starch materials) has approximately a 50% crystalline structure. NuPlastiQ materials available from BioLogiQ differ from many other commercially available thermoplastic starch (TPS) materials in crystallinity versus amorphous characteristics. For example, p. 62-63 of "Thermoplastic Starch Composites and Blends" a PhD thesis by Kris Frost (September 2010) states "[o]f particular interest in TPS is completeness of gelatinisation during processing, and any subsequent tendency toward retrogradation to form V-type amylose crystals". Frost further continues "[g]elatinisation involves loss of granular and crystalline structures by heating with water and often including other plasticizers or modifying polymers. Retrogradation is due to the re-coiling of amylose helical coils. Starch molecules disrupted during gelatinisation slowly re-coil into their native helical arrangements or new single helical conformations known as V type, causing TPS films to rapidly become brittle and lose optical clarity". Thus, conventional TPS tends to re-form a crystalline structure after the gelatinization process used to produce the TPS from raw starch. On the contrary, the NuPlastiQ material available from BioLogiQ does not revert back to a mostly crystalline structure. In addition, it can maintain a stable, relatively high degree of optical clarity, so as to be useful in forming relatively optically clear films (e.g., particularly by sandwiching NuPlastiQ containing layers between polyethylene or other polyolefin layers).

Figure 3:
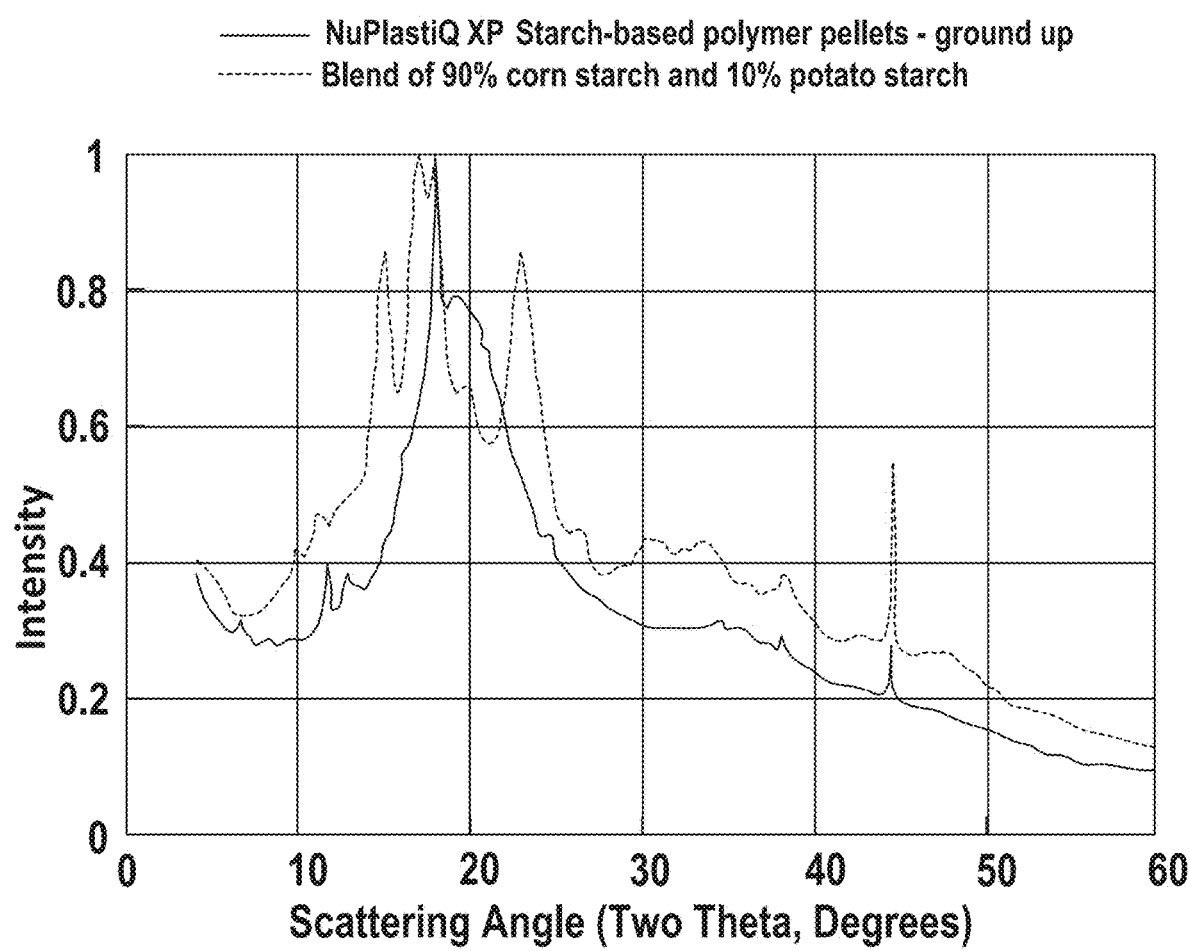
FIG. 3 shows X-ray diffraction patterns for an exemplary NuPlastiQ carbohydrate-based polymeric material commercially available from BioLogiQ as compared to that of the blend of native corn starch and native potato starch used to form the NuPlastiQ. It is believed that the unique structure of the NuPlastiQ, including its amorphous nature, contributes to its properties of blending intimately with a non-biodegradable polymer such as polyethylene.

In contrast to typical TPS materials, the NuPlastiQ materials that are suitable examples of starch-based polymeric materials for use in forming articles described in the present application have an amorphous microstructure, and physical characteristics. The difference in the molecular structure between conventional TPS and NuPlastiQ materials is evidenced by the NuPlastiQ materials as described herein being much less crystalline than conventional thermoplastic starch-based materials as shown by X-ray diffraction, shown in FIG. 3, comparing diffraction pattern results for NuPlastiQ material available from BioLogiQ as compared to a blend of native raw corn starch and native raw potato starch from which the NuPlastiQ in FIG. 3 was formed. The diffraction pattern of the NuPlastiQ as seen in FIG. 3 is much less crystalline (e.g., crystallinity of less than about 10%) than that of the native starch blend (crystallinity of about 50%). The difference in diffraction pattern evidences that a substantial chemical change has occurred in the material, due to processing from the native starches into NuPlastiQ. For example, while there is a prominent diffraction peak between 20-25° with the native starch, no such peak is exhibited in the NuPlastiQ. The native starch further shows a strong peak at about 45° (at an intensity of 0.5 to 0.6), which peak is greatly reduced in the NuPlastiQ (only of about 0.25 to 0.3). Across nearly the entire spectrum, the diffraction intensities are higher for the native starches than for the NuPlastiQ, with the exception of from about 18° to about 22°, as shown. The elevated diffraction intensity seen across a wide spectrum is indicative of greater crystallinity of the native starches as compared to the NuPlastiQ. Numerous other differences also exist, as shown.

By way of example, the carbohydrate-based (e.g., starch-based) polymeric material used in making films according to the present disclosure may have a crystallinity of less than about 40%, less than about 35%, less than about 30%, less than about 25%, less than about 20%, less than about 15%, less than about 10%, less than about 8%, less than about 6%, less than about 5%, or less than about 3%. Any suitable test mechanism for determining crystallinity may be used, e.g., including but not limited to FTIR analysis, X-ray diffraction methods, and symmetrical reflection and transmission techniques. Various suitable test methods will be apparent to those of skill in the art.

In addition to the differences in the microstructure of the finished NuPlastiQ as compared to the starting materials, films, bottles, sheets, disposable utensils, plates, cups, or other articles produced from a blend including the carbohydrate-based polymeric material, NuPlastiQ, and the degradation additives described herein are different from articles that are otherwise similar, but formed using conventional TPS and starch powder, or non-biodegradable plastic materials alone. For example, articles formed by blending the carbohydrate-based polymeric materials such as NuPlastiQ as described herein with a non-biodegradable plastic material and the degradation additive do not have "sea-island" features that are common when blending conventional TPS materials with polymeric materials such as polyethylene. Properties of the different films can be seen by comparing the physical properties of films as shown in Table 11 of Example 5 of Applicant's U.S. patent application Ser. No. 15/481,806, already incorporated by reference. In particular, this table compares the physical properties of films made by blending carbohydrate-based polymeric materials as contemplated herein with non-biodegradable polyethylene versus a conventional TPS blended with PE (Cardia BL-F). In addition to the differences in properties seen in Table 11 of Example 5 of Applicant's U.S. patent application Ser. No. 15/481,806, the film based on conventional TPS materials such as Cardia BL-F, blended with PE is not biodegradable, and not compostable. The presence of the degradation additives does not have an appreciable effect on the microstructure of the finished materials containing NuPlastiQ and adds to the blend's biodegradability.

As described herein, blending of the carbohydrate-based polymeric materials and degradation additive with a non-biodegradable plastic material results in not just the carbohydrate-based material being biodegradable, but the non-biodegradable plastic material actually becomes biodegradable (even where the non-biodegradable plastic material alone is not significantly otherwise biodegradable). Such results do not occur when blending with typical TPS materials. Such differences in biodegradability clearly illustrate that there are significant structural and/or chemical differences in the resulting films and other articles, as the entire composite structure (i.e., the film or other structure) is now capable of being biodegraded.

Without being bound to any particular theory, it is believed that the carbohydrate-based polymeric resin, NuPlastiQ, may reduce the crystallinity of the blended products, interrupting the crystallinity and/or hygoscopic barrier characteristics of the polyethylene or other non-biodegradable plastic material in a way that allows water and bacteria to degrade the arrangements and linkages of otherwise non-biodegradable plastic molecules of the blend along with the carbohydrate-based polymeric resin material. In other words, the long polymer chains of polyethylene or other non-biodegradable plastic material are more easily broken by chemical and mechanical forces that exist in environments that are rich in bacteria and microorganisms, when blended with carbohydrate-based polymeric materials as contemplated herein. Subsequently, the microorganisms that exist naturally in a disposal environment (e.g., in a landfill) can consume the remaining smaller molecules so that they are converted back into natural components (such as $CO_2$, $CH_4$, and $H_2O$). It is believed that this degradation effect is enhanced when the plastic component (PE, PP, etc) is fragmented by action of the OXO additive, as the fragments are more accessible to microbes in the soil, landfill, etc., than they would otherwise be. When a degradation additive as described herein such as an organic additive that attracts microorganisms is also present, the biodegradation of the plastic material is further enabled by action of the microorganisms. The OXO additives increase the surface area of the non-biodegradable polymer subject to attack by microorganisms.

For example, truly biodegradable plastics decompose into natural elements or compounds such as carbon dioxide, methane, water, inorganic compounds, or biomass via microbial assimilation (e.g., the enzymatic action of microorganisms on the plastic molecules). Biodegradation of plastics can be enabled by first breaking down the polymer chains via either chemical or mechanical action but may only be fully accomplished through decomposition of the molecules by microbial assimilation.

Plastics made from petrochemical feedstocks or derived from plant sources begin life as monomers (e.g., single small molecules that can react chemically with other small molecules). When monomers are joined together, they become polymers ("many parts"), and may be known as plastics. Before being joined together, many monomers are readily biodegradable, although after being linked together through polymerization, the molecules become so large and joined in such arrangements and linkages that microbial assimilation by microorganisms is not practical within any reasonable time frame in most instances. However the NuPlastiQ compositions with the degradation additive of this invention impart increased biodegradability.

Polymers are formed with both crystalline (regularly packed) structures and amorphous (randomly arranged) structures. Many polymers contain a high degree of crystallinity with some amorphous regions randomly arranged and entangled throughout the polymeric structure.

NuPlastiQ materials available from BioLogiQ are formed from starting starch materials which are highly crystalline, but in which the finished NuPlastiQ plastic resin material exhibits low crystallinity (substantially amorphous). Such starch-based polymer materials are used as a starting material in the production of articles as described herein. NuPlastiQ is, therefore, plastic that is made from starch. Because of its natural, starch-based origin and carefully controlled linkage types, the molecules (size and links) of plastic made with NuPlastiQ are highly susceptible to biodegradation by enzymatic reactions caused from the introduction of humidity (water) and bacteria or other microorganisms. The presence of the degradation additives describes herein enhances further enhances this biodegradation.

Polyolefins such as rigid forms of polyethylene and polypropylene have a high degree of crystallinity and are made by converting monomer molecules (whether petroleum derived or derived from ethanol or other small building block molecules derived from plant sources) into long chain polymers. The bonds created when connecting the monomers to form long polymer chains are strong and difficult to break. Films and other articles formed from such polymeric materials are not biodegradable. Even if a given article were formed from a blend of conventional non-biodegradable plastic material and conventional TPS, it would not normally suddenly acquire biodegradability characteristics (other than the starch portion of the blend which may sometimes biodegrade).

As described in co-pending application Ser. No. 15/691,566, filed on Aug. 30, 2017, Applicant has developed a process for lending biodegradability to an otherwise non-biodegradable plastic material by blending such plastic material with the carbohydrate-based polymeric materials having low crystallinity e.g. NuPlastiQ. The invention of this application facilitates further biodegradation by adding a degradation additive to the materials blended, such as an OXO additive or chemical material as described herein. Typically the non-biodegradable plastic material has higher crystallinity (e.g., particularly in the case of PE or PP).

In addition to biodegradability, the resulting blend may often have a higher elastic modulus (stiffness, or strength) than polyethylene or other non-biodegradable plastic material, and can be used to make plastic films or other articles that are stronger than the same articles made with pure polyethylene or other pure non-biodegradable plastic material. Such increased strength characteristics are described in U.S. patent application Ser. Nos. 14/853,725 and 15/481,806, already incorporated herein by reference.

Returning to FIG. 1, at 106, the process 100 includes mixing the one or more non-biodegradable plastic materials, the one or more degradation additives and the one or more carbohydrate-based polymeric materials (NuPlastiQ) to produce a mixture of materials. In some cases, the mixing of the one or more non-biodegradable plastic materials and the one or more carbohydrate-based materials and the one or more degradation additives can be performed using one or more mixing devices. In a particular implementation, a mechanical mixing device can be used to mix the one or more non-biodegradable plastic materials, the one or more carbohydrate-based polymeric materials and the additive(s). In an implementation, at least a portion of the components of the mixture of the materials can be combined in an apparatus, such as an extruder, an injection molding machine, or the like. In other implementations, at least a portion of the components of the mixture of the materials can be combined before being fed into the apparatus.

The one or more carbohydrate-based polymeric materials and degradation additives can be present in the mixture of materials in an amount sufficient to lend biodegradability to the particular non-biodegradable plastic material that the carbohydrate-based polymeric material is blended with.

Such threshold level of the carbohydrate-based polymeric material may depend on the material they are being blended with. By way of example, the carbohydrate-based polymeric material may be included in an amount of at least 0.5%, at least 1%, at least 2%, at least 3%, at least 4%, at least 5%, at least 10%, at least 15%, at least 20%, at least 25%, at least 30%, at least 35%, at least 40%, at least 45%, no greater than 99%, no greater than 95%, no greater than 90%, no greater than 80%, no greater than 70%, no greater than 60%, no greater than 50%, from 2% to 98%, from 20% to 40%, from 10% to 40%, from 20% to 30%, from 50% to 80%, or from 40% to 60% by weight of the mixture of materials. More than one carbohydrate-based polymeric material, and/or more than one other plastic material may be included in the blend, if desired.

The non-biodegradable plastic material can be present in the mixture of materials in an amount of at least 0.5%, at least 1%, at least 2%, at least 3%, at least 4%, at least 5%, at least 10%, at least 15%, at least 20%, at least 25%, at least 30%, at least 35%, at least 40%, at least 45%, at least 50%, no greater than 99%, no greater than 95%, no greater than 90%, no greater than 85%, no greater than 80%, no greater than 75%, no greater than 70%, no greater than 65%, or no greater than 60%, from 2% to 98%, from 50% to 90%, from 65% to 75%, from 20% to 50%, or from 40% to 60% by weight of the mixture of materials.

The degradation additives may be added, for example, in an amount of at least 0.1%, 0.3%, at least 0.5%, at least 1%, at least 1.5%, at least 2%, at least 4% at least 5%, no greater than 10%, from 0.5% to 2%, from 1.5% to 2.5% by weight of the mixture of materials.

A compatibilizer may be present in the mixture of materials. The compatibilizer can be mixed with the non-biodegradable plastic material, the carbohydrate-based polymeric material, mixed with both, or provided separately. Often the compatibilizer may be provided with at least one of the polymeric materials, e.g., included in a masterbatch formulation. The compatibilizer can be a modified polyolefin or other modified plastic, such as a maleic anhydride grafted polypropylene, a maleic anhydride grafted polyethylene, a maleic anhydride grafted polybutene, or a combination thereof. The compatibilizer can also include an acrylate based co-polymer. For example, the compatibilizer can include an ethylene methyl acrylate co-polymer, an ethylene butyl-acrylate co-polymer, or an ethylene ethyl acrylate co-polymer. Additionally, the compatibilizer can include a poly(vinylacetate) based compatibilizer. In an embodiment, the compatibilizer may be a grafted version of the non-biodegradable plastic material (e.g., maleic anhydride grafted polyethylene where the non-biodegradable plastic material is polyethylene) or a copolymer (e.g., a block copolymer) where one of the blocks is of the same monomer as the non-biodegradable plastic material (e.g., a styrene copolymer where the non-biodegradable plastic material is polystyrene or ABS).

The mixture of materials may include at least 0.5%, at least 1%, at least 2%, at least 3%, at least 4%, at least 5%, no greater than 50%, no greater than 45%, no greater than 40%, no greater than 35%, no greater than 30%, no greater than 25%, no greater than 20%, no greater than 15%, no greater than 10%, no greater than 9%, no greater than 8%, no greater than 7%, no greater than 6%, from 0.5% by weight to 12%, from 2% to 7%, or from 4% to 6% by weight of a compatibilizer.

One or more additional additives as known to be useful in the plastics' industry can be included in the mixture of materials in an amount of at least 0.5%, at least 1%, at least 1.5%, at least 2%, at least 2.5%, at least 3%, at least 4%, of no greater than 10%, no greater than 9%, no greater than 8%, no greater than 7%, no greater than 6%, no greater than 5%, from 0.2% to 12%, from 1% to 10%, from 0.5% to 4%., or from 2% by weight to 6% by weight of the mixture.

While principally described in the context of a mixture of thermoplastic materials that can be melted together, to form a desired blend, in some embodiments, it may be possible to blend the carbohydrate-based polymeric material capable of lending biodegradability and the one or more degradation additives with a plastic material that is not thermoplastic (e.g., that is thermoset, e.g., such as for silicone). For example, the resin components that are precursors of such non-thermoplastic non-biodegradable plastic material may be blended with the carbohydrate-based polymeric material, where polymerization or other formation of the non-thermoplastic material may occur in the presence of the carbohydrate-based polymeric material and the degradation additive(s), resulting in a finished article that is a blend of the carbohydrate-based polymeric material, the degradation additive(s), and a thermoset or other non-thermoplastic plastic material, where the carbohydrate-based polymeric material and additive(s) may lend biodegradability to the non-thermoplastic plastic material upon blending of the two together.

Referring to FIG. 1, at 108, particularly where the materials are thermoplastic, the process 100 may include heating the mixture of materials. In an implementation, the mixture of materials can be heated to a temperature of at least 100° C., at least 110° C., at least 115° C., at least 120° C., at least 125° C., at least 130° C., at least 135° C., at least 140° C., no greater than 250° C., no greater than 190° C., no greater than 180° C., no greater than 175° C., no greater than 170° C., no greater than 165° C., no greater than 160° C., no greater than 155° C., no greater than 150° C., from 95° C. to 250° C., from 120° C. to 180° C., or from 125° C. to 165° C.

The mixture of materials including the ordinarily non-biodegradable plastic material and the carbohydrate-based polymeric material and degradation additive(s) can be heated in one or more chambers of an extruder. In some cases, one or more chambers of the extruder can be heated at different temperatures. The speed of one or more screws of the extruder can be any desired rate.

At 110, an article is produced using the mixture of materials including NuPlastiQ and the degradation additive. In some cases, the article can include a film. In other cases, the article can be formed from a film. In other embodiments, the article can have a shape based on a design, such as a mold (e.g., injection molded). Any conceivable article formed of plastic may be formed from the mixture, e.g., including but not limited to films, bags, bottles, caps, lids, sheets, boxes, plates, cups, utensils, and the like. Where the article is a film, the film can be formed using a die by injecting a gas into the heated mixture of material to form the film (i.e., blowing the film). Films can be sealed and/or otherwise modified to be in the form of a bag or other article.

Where the article is a film, the film can be comprised of a single layer or multiple layers. The film or any individual layers can have a thickness of at least 0.001 mm, at least 0.002 mm, at least 0.004 mm, at least 0.01 mm, at least 0.02 mm, at least 0.03 mm, at least 0.05 mm, at least 0.07 mm, at least 0.10 mm, no greater than 2 mm, no greater than 1 mm, no greater than 0.5 mm, no greater than 0.1 mm, from about 0.05 mm to about 0.5 mm, or from 0.02 mm to 0.05 mm. While there may be some overlap in thickness values for film and sheet articles, it will be appreciated that sheet materials of greater thickness than such film values may of course be provided, produced by any desired plastic manufacturing process.

Films or other articles can have strength characteristics that are characterized through testing, such as a dart drop impact test (ASTM D-1709), tensile strength at break test (ASTM D-882), tensile elongation at break test (ASTM D-882), a secant modulus test (ASTM D-882), and/or an Elmendorf Tear test (ASTM D-1922). Films can have a dart drop impact test value of at least 150 g, at least 175 g, at least 200 g, at least 225 g, at least 250 g, at least 275 g, at least 300 g, no greater than 400 g, no greater than 375 g, no greater than 350 g, or no greater than 325 g, from 140 g to 425 g, from 200 g to 400 g, from 250 g to 350 g, from 265 g to 330 g. In an implementation, such values may be for whatever the thickness of the film is. In another implementation, such values may be for a 1 mil thickness film formed from the mixture of materials.

The article can have a tensile strength at break test value in the machine direction of at least 3.5 kpsi, at least 3.7 kpsi, at least 3.9 kpsi, at least 4.1 kpsi, at least 4.3 kpsi, or at least 4.5 kpsi, no greater than 5.5 kpsi, no greater than 5.3 kpsi, no greater than 5.1 kpsi, no greater than 4.9 kpsi, or no greater than 4.7 kpsi, from 3.5 kpsi to 5.5 kpsi, or from 4.1 kpsi to 4.9 kpsi.

The article can have a tensile strength at break test value in the transverse direction of at least 3.2 kpsi, at least 3.4 kpsi, at least 3.6 kpsi, at least 3.8 kpsi, at least 4.0 kpsi, at least 4.2 kpsi, no greater than 5.7 kpsi, no greater than 5.5 kpsi, no greater than 5.3 kpsi, no greater than 5.1 kpsi, no greater than 4.9 kpsi, no greater than 4.7 kpsi, no greater than 4.5 kpsi, from 3.2 kpsi to 5.7 kpsi, or from 3.6 kpsi to 5.0 kpsi.

The article can have a tensile elongation at break test value in the machine direction of at least 550%, at least 560%, at least 570%, at least 580%, at least 590%, at least 600%, at least 610%, at least 620%, no greater than 725%, no greater than 710%, no greater than 700%, no greater than 680%, no greater than 665%, no greater than 650%, no greater than 635%, from 550% to 750%, or from 600% to 660%.

The article can have a tensile elongation at break test value in the transverse direction of at least 575%, at least 590%, at least 600%, at least 615%, at least 630%, or at least 645%, no greater than 770%, no greater than 755%, no greater than 740%, no greater than 725%, no greater than 710%, no greater than 695%, no greater than 680%, from 575% to 775%, or from 625% to 700%.

Where applicable the article can have an Elmendorf tear force test value in the machine direction of at least 280 g/mil, at least 300 g/mil, at least 320 g/mil, at least 340 g/mil, or at least 360 g/mil, no greater than 450 g/mil, no greater than 430 g/mil, no greater than 410 g/mil, no greater than 390 g/mil, or no greater than 370 g/mil, from 275 g/mil to 475 g/mil, or from 325 g/mil to 410 g/mil.

Where applicable the article can have an Elmendorf tear force test value in the transverse direction of at least 475 g/mil, at least 490 g/mil, at least 500 g/mil, at least 525 g/mil, at least 540 g/mil, or at least 550 g/mil, no greater than 700 g/mil, no greater than 680 g/mil, no greater than 650 g/mil, no greater than 625 g/mil, no greater than 600 g/mil, no greater than 580 g/mil, or no greater than 570 g/mil, from 475 g/mil to 725 g/mil, or from 490 g/mil to 640 g/mil.

Where applicable the article can have a secant modulus of elasticity test value in the machine direction of at least 20 kpsi, at least 22 kpsi, at least 24 kpsi, at least 26 kpsi, at least 28 kpsi, or at least 30 kpsi, no greater than 40 kpsi, no greater than 38 kpsi, no greater than 36 kpsi, no greater than 34 kpsi, or no greater than 32 kpsi, from 20 kpsi to 40 kpsi, or from 25 kpsi to 35 kpsi.

Where applicable the article can have a secant modulus of elasticity test value in the transverse direction of at least 20 kpsi, at least 22 kpsi, at least 24 kpsi, at least 26 kpsi, at least 28 kpsi, or at least 30 kpsi, no greater than 40 kpsi, no greater than 38 kpsi, no greater than 36 kpsi, no greater than 34 kpsi, or no greater than 32 kpsi, from 20 kpsi to 40 kpsi, or from 25 kpsi to 35 kpsi.

In some cases, articles including a carbohydrate-based polymeric material formed from a mixture of two or more starches have values of strength properties that are greater than articles including a carbohydrate-based polymeric material formed from a single starch. For example, an article including a carbohydrate-based polymeric material formed from a mixture of two or more starches can have a dart drop impact test value (in grams or g/mil of thickness) that is at least about 10% greater than an article where the carbohydrate-based polymeric material is formed from a single starch, at least about 25% greater, at least about 50% greater, at least about 75% greater, from 10% greater to 150% greater or from 60% greater to 120% greater than the same article but including a carbohydrate-based polymeric material formed from a single starch. Details of such increased strength is found within U.S. patent application Ser. Nos. 14/853,725 and 15/481,806, already incorporated by reference. In the absence of significant exposure to sunlight or degrading microorganisms, the presence of the degradation additive(s) is not expected to have a deleterious effect on the physical properties of the blend.

When subjected to biodegradation testing (e.g., whether biomethane potential testing, or any applicable ASTM standard, such as ASTM D-5511, ASTM D-5526, ASTM D-5338, or ASTM D-6691, the articles of this invention, including NuPlastiQ and the degradation additives significantly biodegrade. Under such testing, and within a given time period (e.g., 30 days, 60 days, 90 days, 180 days, 365 days (1 year), 2 years, 3 years, 4 years, or 5 years, the articles may show substantial biodegradation of the total polymeric content, and/or the non-biodegradable plastic content (apart from the carbohydrate-based polymeric content). Biomethane potential testing is typically conducted over 30 or 60 days, although sometimes for as long as 90 days. The longer time period tests are more typically performed under any of the above mentioned ASTM standards. Articles made from the compositions of this invention may show biodegradation that is greater than the carbohydrate-based polymeric material content thereof, indicating that the other plastic material(s) are also biodegrading (or exhibit the potential to biodegrade under a biomethane potential test).

Particularly when subjecting the articles to testing simulating biodegradation under landfill or other degradation conditions (e.g., composting conditions, or marine conditions) for 180 days, 200 days, 365 days (1 year), 2 years, 3 years, or 5 years, the biodegradation can be greater than the weight percent of carbohydrate-based polymeric materials (NuPlastiQ) within the article. In other words, inclusion of the described carbohydrate-based polymeric materials and degradation additive(s) can result in at least some biodegradation of the non-biodegradable plastic material (which materials alone are not significantly biodegradable).

For example, an article such as a film that is formed from a blend of the carbohydrate-based polymeric materials, the degradation additive(s) and PE may exhibit biodegradation after such periods of time that is greater than the weight fraction of the carbohydrate-based polymeric materials in the film, indicating that the PE (normally not thought to be biodegradable) is actually being biodegraded, with the carbohydrate-based polymeric material. Such results are surprising, and particularly advantageous.

Biomethane potential testing determines the potential for anaerobic biodegradation based methanogenesis as a percent of total methanogenesis potential. Biomethane potential testing can be used to predict biodegradability of the tested samples according to the ASTM D-5511 standard and the biomethane potential testing can be conducted using one or more conditions from the ASTM D-5511 standard. For example, the biomethane potential testing can take place at a temperature of about 52° C. Additionally, the biomethane potential testing can have some conditions that are different from those of ASTM D-5511, e.g., to accelerate the test so to be completed within the typical 30, 60, or sometimes as long as 90 days. Biomethane potential testing can employ an inoculum having from 50% to 60% by weight water and from 40% to 50% by weight organic solids. For example, an inoculum used in biomethane potential testing can have 55% by weight water and 45% by weight organic solids. Biomethane potential testing can also take place at other temperatures, such as from 35° C. to 55° C. or from 40° C. to 50° C.

When subjected to biodegradation testing, an article made from the compositions of this invention having an amount of carbohydrate-based polymeric material, degradation additive and non-biodegradable plastic material as described herein can exhibit enhanced biodegradation, as a result of the introduction of the additive and carbohydrate-based polymeric material NuPlastiQ into the article. For example, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, or even at least 95% of the non-carbohydrate-based polymeric material (e.g., the non-biodegradable plastic material) may biodegrade over a period of at least about 1 year, at least about 2 years, at least about 3 years, or at least about 5 years when subjected to landfill, composting, and/or marine conditions (or conditions simulating such). Such biodegradation is particularly remarkable and advantageous. Thus not only does the carbohydrate-based polymeric material biodegrade, but the non-biodegradable plastic material does as well.

With increased time, the amount of biodegradation can be very high, such that in at least some implementations, substantially the entire article biodegrades (e.g., biodegradation of at least about 85%, at least about 90%, or at least about 95% within 180 days, or 200 days, or 365 days (1 year), within 2 years, within 3 years, within 5 years, or other period).

Figure 2:
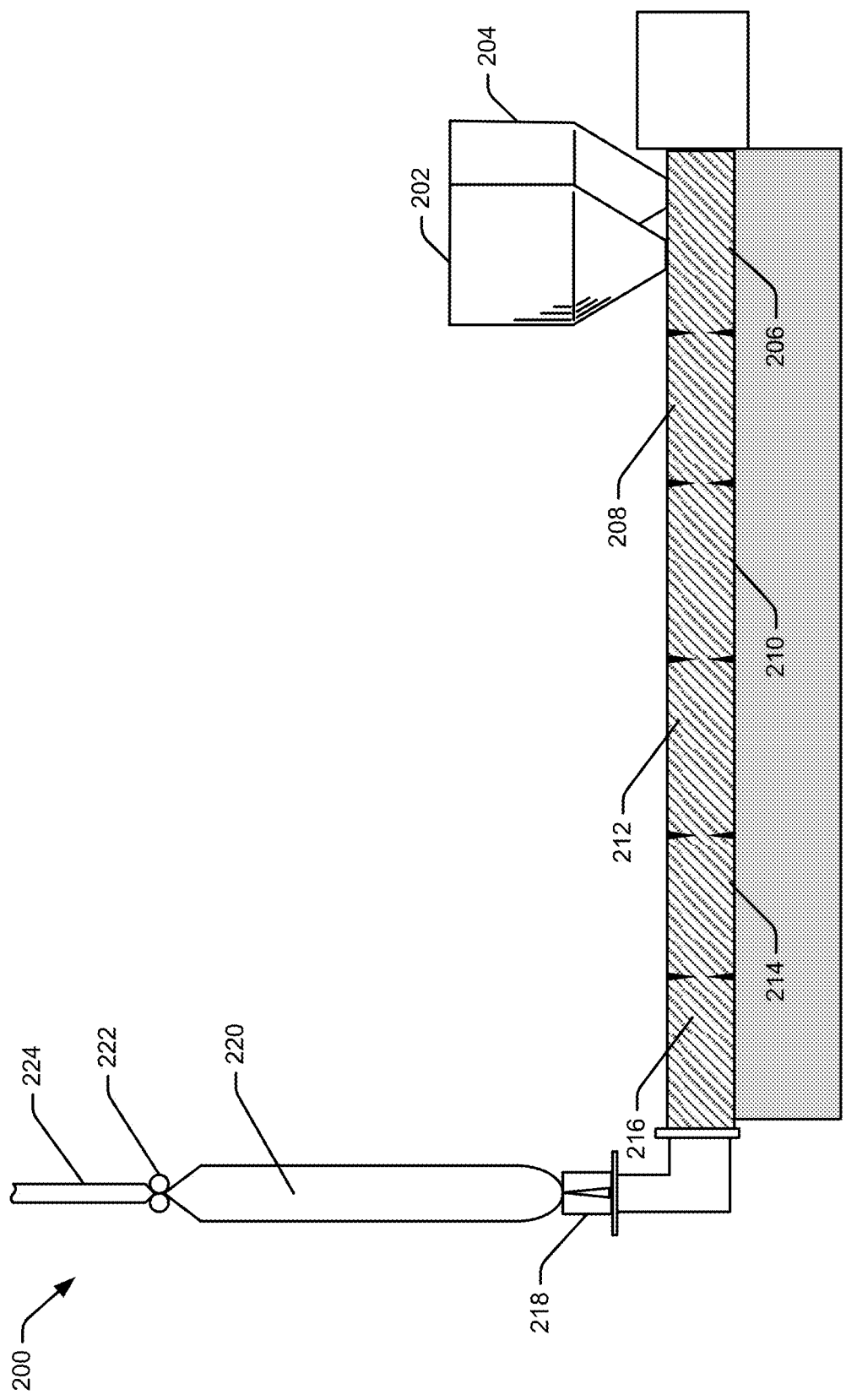
FIG. 2 illustrates components of an example manufacturing system to produce articles including biodegradable materials of this invention.

FIG. 2 illustrates components of an example manufacturing system 200 to produce articles according to the present disclosure. In some cases, the manufacturing system 200 can be used in the process 100 of FIG. 1. In an illustrative example, the manufacturing system 200 is an extruder, such as a single screw extruder or a twin screw extruder.

In an implementation, one or more non-biodegradable plastic materials, one of more degradation additives and one or more carbohydrate-based polymeric materials are provided via a first hopper 202 and a second hopper 204. A compatibilizer may be included with either or both materials (e.g., in a masterbatch thereof).

The one or more carbohydrate-based polymeric materials, one or more degradation additives and the one or more non-biodegradable plastic materials can be mixed in a first chamber 206 to produce a mixture of materials. In some cases, the mixture of materials can include from 5% by weight to 40% by weight of the one or more carbohydrate-based polymeric materials, from 60% by weight to 94% by weight of the one or more non-biodegradable plastic materials, from 0.1 to 5% by weight of degrading additive and from 1% by weight to 9% by weight of the one or more compatibilizers. The ranges of course may be varied outside the above ranges, depending on desired characteristics.

In the example implementation shown in FIG. 2, the mixture of materials can pass through a number of chambers, such as the first chamber 206, a second chamber 208, a third chamber 210, a fourth chamber 212, a fifth chamber 214, and an optional sixth chamber 216. The mixture of materials can be heated in the chambers 206, 208, 210, 212, 214, 216. In some cases, a temperature of one of the chambers can be different from a temperature of another one of the chambers. In an illustrative example, the first chamber 206 is heated to a temperature from 120° C. to 140° C.; the second chamber 208 is heated to a temperature from 130° C. to 160° C.; the third chamber 210 is heated to a temperature from 135° C. to 165° C.; the fourth chamber 212 is heated to a temperature from 140° C. to 170° C.; the fifth chamber 214 is heated to a temperature from 145° C. to 180° C.; and the optional sixth chamber 216 is heated to a temperature from 145° C. to 180° C.

The heated mixture can then be extruded using a die 218 to form an extruded object, such as a film, sheet, or the like. Injection molding, thermoforming, or other plastic production processes may be used to manufacture various articles such as utensils, plates, cups bottles, caps or lids therefore, or the like. In film blowing, a gas can be injected into the extruded object to expand it with a pressure from 105 bar to 140 bar. The resulting tube 220 can be drawn up through rollers 222 to create a film 224 with a thickness typically from 0.02 mm (about 0.8 mil) to 0.05 mm (about 2 mil). Even thinner films can be made using the blends as described herein, e.g., having a thickness as little as 0.1 mil (0.004 mm). Of course, thicknesses greater than 2 mil can also be achieved. In some cases, the film 224 can be comprised of a single layer. In other cases, the film 224 can be comprised of multiple layers. Where multiple layers are present, at least one of the layers may include the carbohydrate-based polymeric material and the degradation additive. In some embodiments, the carbohydrate-based polymeric material and degradation additive may be present in one or more outer layers. In another embodiment, the carbohydrate-based polymeric material and additive may be present in an inner layer. Where no carbohydrate-based polymeric material is included in the outer layer(s), biodegradation of the outer layer(s) may not occur.

The concepts described herein will be further described in the following examples.

Example 1

Samples with compositions shown in Table 2 are tested for about 180 days to determine biodegradability characteristics using biomethane potential for anaerobic biodegradation based on methanogenesis as a percent of total methanogenesis potential. The biomethane potential test is intended to determine whether the materials tested exhibit any significant potential for biodegradation. Such may be conducted at a temperature of about 52° C. using an inoculum having about 55% by weight water and about 45% by weight organic solids. The test is carried out in accordance with ASTM D-5511 for 180 days. A positive control of cellulose and a negative control of 100% polyethylene is used for comparison. The results indicate that the sample formed from a mixture of a carbohydrate-based polymer (NuPlastiQ® GP), low density polyethylene and the degradation additive, Enso Restore™ or OXO-Terra™, (shown in % by weight) biodegrades to an extent that is greater than the amount of NuPlastiQ® in the sample, indicating some of the otherwise non-biodegradable polyethylene is biodegrading in addition to the biodegradation of the carbohydrate-based polymeric material. The positive sample substantially degrades and the negative control sample shows little or no degradation.

TABLE 2

| Sample No. | NuPlastiQ (%) | Polyethylene (%) | Maleic Anhydride Modified LLDPE (%) | Degradation Additive | Form |
|---|---|---|---|---|---|
| 1 | 0 | 100 | | none | Press-outs |
| 2 | 20 | 74 | 5% | 1% OXO Terra™ Willow Ridge | Film |
| 3 | 20 | 74 | 5% | 1% Enso Restore™ | Film |

IV. Conclusion

In closing, although the various implementations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

In closing, it is to be understood that the embodiments of the inventive features disclosed herein are illustrative of the principles of the inventive features. Other modifications that may be employed are within the scope of the inventive features. Thus, by way of example, but not of limitation, alternative configurations of the inventive features may be utilized in accordance with the teachings herein. Accordingly, the inventive features are not limited to that precisely as shown and described.

The invention claimed is:

1. A method for lending biodegradability to a plastic material that itself is not otherwise biodegradable, the method comprising:
   providing a plastic material that is not biodegradable on its own;
   providing a starch-based polymeric material formed from a chemical reaction and/or alternation of starch and a plasticizer, wherein said starch-based polymeric material: (1) is substantially devoid of starch in native form; (2) has a crystallinity of less than about 20% and resists recrystallization; (3) has a water content of no more than about 2% by weight; and (4) when blended in a mixture with the plastic material that is not biodegradable on its own, the blend exhibits a lack of sea-island features within said blend;
   providing at least one degradation additive that in combination with at least one of oxygen, ultraviolet light, or microbial action enables biodegradation of the plastic material that is not itself biodegradable; and
   blending the starch-based polymeric material, the plastic material and the at least one degradation additive;
   wherein at least 10% of the carbon atoms of the plastic material become carbon atoms of at least one of carbon dioxide or methane within about 1 year in simulated landfill conditions, simulated compost conditions or simulated marine conditions.

2. The method of claim 1 wherein the at least one degradation additive comprises a material that enhances biodegradation of the plastic material by action of ultraviolet light and/or oxygen.

3. The method of claim 2 wherein the at least one degradation additive comprises a salt of a transition metal, the transition metal comprising one or more of cobalt, iron, manganese, magnesium, nickel or zinc.

4. The method of claim 3 wherein the salt of a transition metal is a salt of iron, magnesium, manganese, or cobalt.

5. The method of claim 3, wherein the at least one degradation additive comprises a salt of cobalt.

6. The method of claim 1, wherein the at least one degradation additive comprises a salt of a transition metal and a component that nurtures one or more microorganisms that enhance biodegradation of the plastic material that is not itself biodegradable, the transition metal comprising at least one of cobalt, iron, manganese, magnesium, nickel or zinc.

7. The method of claim 1 wherein the at least one degradation additive comprises a salt of a transition metal and at least one of a sugar or a nitrogen-containing material, the transition metal comprising at least one of cobalt, iron, manganese, magnesium, nickel or zinc.

8. The method of claim 6 wherein the component that nurtures one or more microorganisms comprises one or more of malt extract, maltose, lactose, xylose, glucose, galactose, peptone, yeast extract, or asparagine.

9. The method of claim 6 wherein the component that nurtures one or more microorganisms comprises xylose.

10. The method of claim 6 wherein at least one microorganism secretes the enzyme laccase.

11. The method of claim 6 wherein the microorganism comprises one or more fungi.

12. The method of claim 6 wherein the microorganism comprises one or more bacteria.

13. The method of claim 2 wherein the at least one degradation additive comprises at least one of poly(methyl methacrylate) grafted titanium dioxide, copper phthalocyanine sensitized titanium dioxide, ceria, zinc oxide, copper sulfide, or vanadium(III) acetyl acetonate.

14. The method of claim 6 wherein the at least one degradation additive interacts with enzymes secreted by the microorganism to cause hydrolysis of the non-biodegradable polymer.

15. A method for lending biodegradability to a plastic material that itself is not otherwise biodegradable, the method comprising:
   providing a plastic material that is not biodegradable on its own;
   providing a starch-based polymeric material formed from a chemical reaction and/or alternation of starch and a plasticizer, wherein said starch-based polymeric material: (1) is substantially devoid of starch in native form; (2) has a crystallinity of less than about 20% and resists recrystallization; (3) has a water content of no more than about 2% by weight and (4) when blended in a mixture with the plastic material that is not biodegradable on its own, the blend exhibits a lack of sea-island features within said blend;
   providing at least one degradation additive that in combination with at least one of oxygen, ultraviolet light, or microbial action enables biodegradation of the plastic material that is not itself biodegradable; and
   blending the starch-based polymeric materials, the plastic material and the at least one degradation additive;

wherein at least 25% of the carbon atoms of the plastic material become carbon atoms of at least one of carbon dioxide or methane within about three years in simulated landfill conditions, simulated compost conditions or simulated marine conditions.

16. A biodegradable composition comprising:

a non-biodegradable polymer;

a starch-based polymeric material formed from a chemical reaction and/or alternation of starch and a plasticizer, wherein said starch-based polymeric material: (1) is substantially devoid of starch in native form; (2) has a crystallinity of less than about 20% and resists recrystallization; (3) has a water content of no more than about 2% by weight and (4) when blended in a mixture with the non-biodegradable polymer, the blend exhibits a lack of sea-island features within said blend; and a degradation additive comprising at least one of (i) an OXO additive comprising a salt of a transition metal, the transition metal comprising at least one of cobalt, iron, manganese, magnesium, nickel or zinc, (ii) a sugar or other organic material that provides nutrition and/or a cultured environment for microorganisms that biodegrade the non-biodegradable polymer, or (iii) an inorganic salt that provides nutrition and/or a cultured environment for microorganisms that biodegrade the non-biodegradable polymer.

17. The composition of claim 16 wherein the degradation additive comprises the OXO additive comprising the salt of a transition metal.

18. The composition of claim 17 wherein the salt of a transition metal is a salt of cobalt, magnesium, manganese, or iron.

19. The composition of claim 16 wherein the degradation additive comprises a salt of a transition metal and an organic material that provides nutrition for microorganisms present in an environment in which the composition is discarded.

20. The composition of claim 16 wherein the degradation additive interacts as a catalyst with enzymes produced by microorganisms to promote hydrolysis of the non-biodegradable polymer.

* * * * *